United States Patent
Eitzman et al.

(10) Patent No.: US 9,430,589 B2
(45) Date of Patent: Aug. 30, 2016

(54) SAFETY AUTOMATION BUILDER

(71) Applicant: Rockwell Automation Technologies, Inc., Mayfield Heights, OH (US)

(72) Inventors: Mark Eitzman, Aurora, OH (US); Christopher Brogli, Winchester, KY (US); Derek W. Jones, Galloway (GB); Jonathan B. Johnson, Milwaukee, WI (US); Ian James Murgatroyd, Suffolk (GB); David Main-Reade, West Lothian (GB); Brian J. Maher, Co. Tipperary (IE); Brian Haley Schriver, Woburn, MA (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 477 days.

(21) Appl. No.: 13/759,978

(22) Filed: Feb. 5, 2013

(65) Prior Publication Data
US 2014/0222383 A1     Aug. 7, 2014

(51) Int. Cl.
*G06F 17/50* (2006.01)
(52) U.S. Cl.
CPC .......... *G06F 17/50* (2013.01); *G06F 2217/02* (2013.01); *G06F 2217/04* (2013.01)
(58) Field of Classification Search
USPC ........................................................... 703/1
See application file for complete search history.

(56) References Cited

U.S. PATENT DOCUMENTS

| 8,614,633 B1* | 12/2013 | Lear ...................... G08B 29/188 114/382 |
| 2004/0148130 A1* | 7/2004 | Scott et al. ................... 702/183 |
| 2005/0222698 A1* | 10/2005 | Eryurek et al. ................. 700/90 |
| 2006/0020604 A1* | 1/2006 | Murez et al. .................. 707/100 |
| 2007/0122911 A1* | 5/2007 | Browning et al. .............. 436/55 |
| 2007/0192715 A1* | 8/2007 | Kataria et al. ................ 715/764 |

(Continued)

FOREIGN PATENT DOCUMENTS

| CN | 1534422 A | 10/2004 |
| CN | 101287743 A | 10/2008 |

(Continued)

OTHER PUBLICATIONS

EP2378445 Oct. 2011.*

(Continued)

*Primary Examiner* — Omar Fernandez Rivas
*Assistant Examiner* — Cuong Luu
(74) *Attorney, Agent, or Firm* — Amin, Turocy & Watson, LLP

(57) ABSTRACT

A safety automation builder that assists in development of compliant safety functions for industrial safety systems is provided. The safety automation builder imports a system drawing or image of a user's manufacturing line, machine, or production area, and guides the user through a workflow that facilitates configuration of safety functions for each hazardous access point. The safety automation builder leverages a library of safety devices and encoded knowledge of industrial safety standards to guide the user toward selection of suitable safety devices for mitigating risks associated with the access points. Once configured, the safety automation builder can export the safety function data to an external verification system for confirmation that the configured safety functions comply with the prescribed industrial safety standards.

20 Claims, 26 Drawing Sheets

(56) References Cited

U.S. PATENT DOCUMENTS

| | | | |
|---|---|---|---|
| 2007/0194944 A1* | 8/2007 | Galera | F16P 3/14 340/686.6 |
| 2007/0198108 A1 | 8/2007 | Nair et al. | |
| 2007/0208432 A1* | 9/2007 | Hawrysz | 700/1 |
| 2009/0012631 A1* | 1/2009 | Fuller | 700/1 |
| 2009/0234465 A1* | 9/2009 | Korsten | G05B 19/0428 700/17 |
| 2011/0200245 A1* | 8/2011 | Crothers | G05B 19/4183 382/141 |
| 2011/0295399 A1* | 12/2011 | Plociennik | B22D 7/00 700/97 |
| 2012/0095575 A1* | 4/2012 | Meinherz | G05B 19/409 700/79 |
| 2013/0198101 A1* | 8/2013 | Beckerle | G06Q 10/08 705/330 |

FOREIGN PATENT DOCUMENTS

| | | |
|---|---|---|
| EP | 2378445 A1 | 10/2011 |
| WO | 2009030362 A2 | 3/2009 |

OTHER PUBLICATIONS

EP2360540 Mar. 2009.*
European Search Report for European Patent Application No. 14153763.9-1954 / 2763062 dated Jul. 24, 2014, 7 pages.
Huelke. "SISTEMA: A Tool for the Easy Application of the Control Standard EN ISO 13849-1", published online at [http://www.dguv.de/ifa/en/pra/softwa/sistema/paper_e.pdf], 2008, retrieved May 8, 2013, 8 pages.
Chinese Office Action dated Jan. 29, 2016 for Chinese Patent Application No. 201410045152.3, 13 pages.

* cited by examiner

SAFETY PROJECT BILL OF MATERIALS — 702

| Qty | CATELOG NUMBER | DESCRIPTION | Ds | List Ea | Typical Delivery |
|---|---|---|---|---|---|
| 1 | 445L-P4E0600FP | Micro 400 Safety Light Curtain, Pair, Res 30mm, Pt Ht, 600mm | E8 | $1,220.00 | Preferred |
| 2 | 445L-AC8RJ5 | M12 to RJ45, 5 Meter | E8 | $26.30 | Preferred |
| 1 | 440R-ACABL2 | Ribbon Cable 10 pin for 2 extension | E8 | $36.40 | |
| 1 | 440R-P226AGS-NNR | MSR42 Multifunction Controller for GuardSHield Light Curtains | E8 | $507.00 | Preferred |
| 1 | 440R-D22R2 | Guardmaster Safety Relay, 2 Dual Channel Inputs, 1 NC Solid State Aux Output | E8 | $402.99 | Preferred |
| 1 | 100S-C37EJ14BC | MCS 100S-C Safety Contactor, 37A, 24VDC, Bifurcated Contact | E8 | $411.07 | |
| ... | ... | ... | ... | ... | |

FIG. 7

SAFETY FUNCTION TABLE ⟵ 802

| SYMBOL | SAFETY FUNCTION | INPUT DEVICE | OUTPUT DEVICE | LOGIC DEVICE | PLr | # OPS |
|---|---|---|---|---|---|---|
| SF-1 | SafetyFunction_1 | Tongue | IEC Safety Contactors | Guardmaster Relay and Expansion Unit | PLr-D | 43800 |
| SF-2 | SafetyFunction_2 | Non-Contact | 7005-CF Safety Control Relay | Guardmaster Relay and Expansion Unit | PLr-D | 43800 |
| SF-3 | SafetyFunction_3 | GuardShield | PowerFlex 40P with SafeTorque Off | Single Function Relays | PLr-D | 43800 |
| ... | ... | ... | ... | ... | ... | ... |

FIG. 8

SAFETY AUTOMATION BUILDER

TECHNICAL FIELD

The subject application relates generally to industrial automation, and, more particularly, to systems and methods for guided safety system design and documentation in accordance with industry standards.

BACKGROUND

Modern industrial automation lines often include a number of hazardous machine access points that, if inappropriately breached, can cause injury to an operator. These access points can expose the operator to risks associated with dangerous machine components, including but not limited to crushing by moving parts, electrocution through contact with exposed high-voltage lines or components, chemical burn, laceration or dismemberment by a moving blade, radiation exposure, or other such hazards.

To mitigate the risks associated with these access points, plant engineers typically implement safety solutions designed to protect operators who interact with the access points. For example, a proximity switch may be installed on a safety gate that provides access to a hazardous machine. The proximity switch output may be tied to a logic device that operates a contactor to isolate power from the machine when the proximity switch indicates that the safety gate is open. In another example, an access point that allows an operator to load a part in a stamping press area may be protected by a light curtain that detects when a physical body (e.g., an operator's arm) has reached through the access point. As with the exemplary proximity switch described above, the light curtain's output can be tied to a logic device that controls a contactor to isolate power to the press while the light curtain is broken by the detected body.

The functional safety solutions implemented for a hazardous access point must be compliant with current industry-specific functional safety standards, such as those defined by the International Organization for Standardization (ISO) or the International Electrotechnical Commission (IEC). Such standards may define formal methodologies for determining a risk level associated with a machine, and provide statutory guidelines for designing safety systems to mitigate the risk. For example, the safety standards may define requirements dictating safety system types and configuration that must be implemented to counter a particular type of hazard.

Selecting the proper safety system hardware for a given safety function that satisfies the industrial safety standards can be a complicated and time-consuming task, typically involving manual selection of safety devices from a catalog and documentation of the input, logic, and output devices that make up the safety system. Moreover, safety system designers are required to be conversant with the prevailing safety standards to ensure that the resulting safety function is designed in compliance with the standards.

The above-described deficiencies of today's industrial control and business systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

One or more embodiments of the present disclosure relate to automated design and documentation of safety solutions for industrial automation systems. To this end, a safety automation builder can guide a designer through the process of identifying hazardous access points throughout their automation system and designing a suitable safety solution for each access point in compliance with industrial safety standards. The safety automation builder can include an interface that allows the designer to import an image of the machine or line for which one or more safety solutions are to be implemented, and to superimpose safety design aspects (e.g., zones, hazardous access areas, safety function devices, etc.) on the imported image. For each identified access point, the safety automation builder guides the user though the steps of defining a required performance level for the access point (as determined by a risk assessment performed on the machine) and designing one or more safety functions that satisfy the required performance level. To facilitate automated selection of suitable input, logic, and output devices for each required safety function, the safety automation builder can include a product selection tool configured to access a library of safety devices and present a filtered set of devices that meet the application criteria defined by the user.

As the user defines the solutions and selects input, logic, and output components, the safety automation builder builds a table of safety functions organized according to the user-defined hazardous access points. This table can be used as the basis for documentation of the resulting safety systems to be implemented on the line (including but not limited to a bill of materials).

In addition, the safety automation builder can include an export tool that exports the safety function data compiled in the table to an external performance level verification tool for confirmation that the resulting safety function designs will operate at the required performance levels and thus comply with the industrial safety standards. The safety automation builder can receive a validation report from the safety compliance verification tool, which can report the performance level validation results for each safety function as determined by the validation tool. In this way, the safety automation builder can mitigate the need to manually enter the safety function data in the required fields of the validation tool.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 7 illustrates an exemplary bill of materials that can be created by the safety automation builder.

FIG. 8 illustrates an exemplary safety function table that can be created using the safety automation builder.

DETAILED DESCRIPTION

Figure 1:
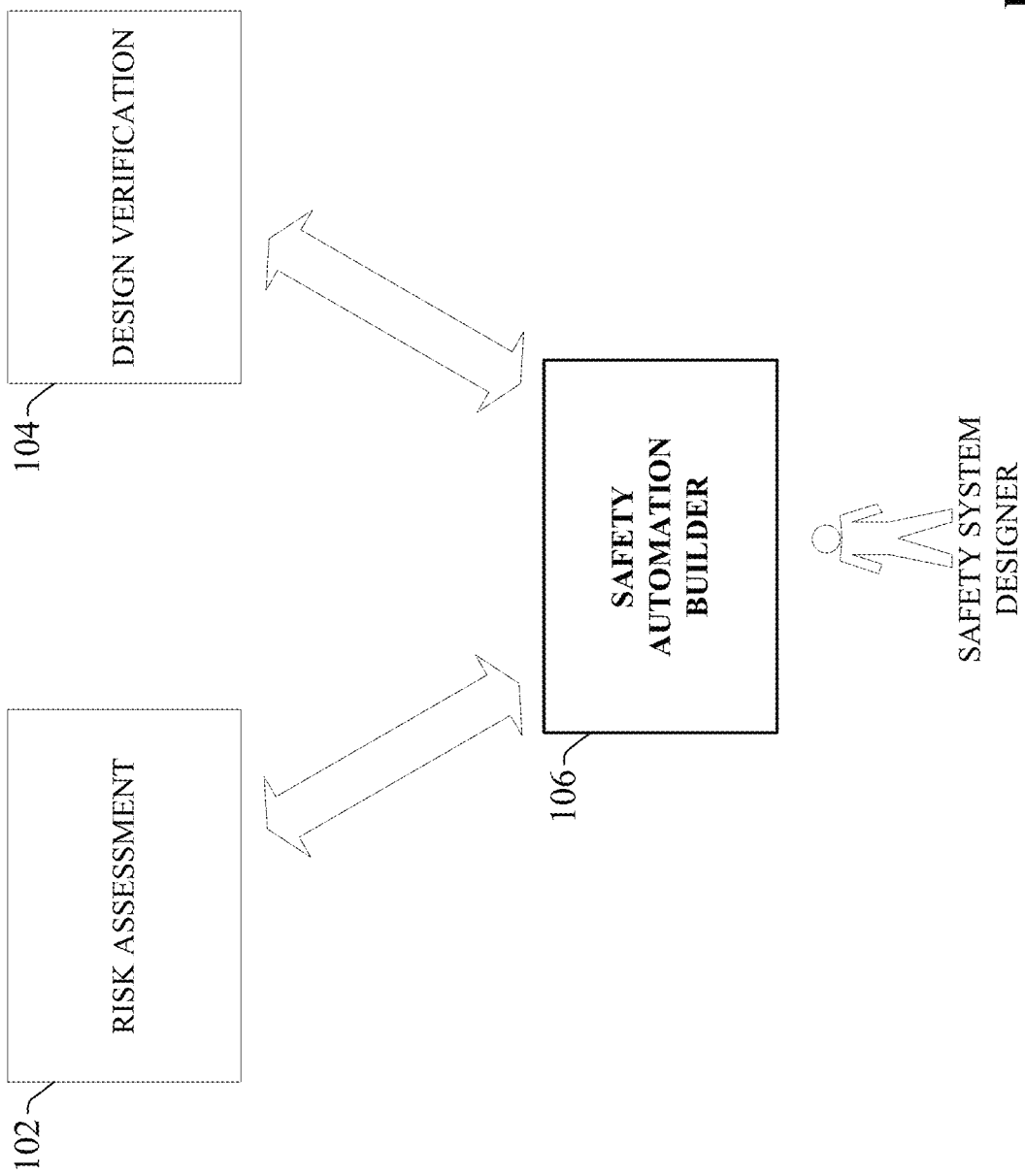
FIG. 1 illustrates a general overview of the conceptual relationship between risk assessment, design verification, and the safety automation builder.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a hard disk drive, multiple storage drives (of optical or magnetic storage medium) including affixed (e.g., screwed or bolted) or removably affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Design of functional safety solutions for industrial automation systems can be broadly viewed in terms of three general tasks—risk assessment, safety system design, and design verification. Risk assessment is a formal evaluation of an automation line or machine that determines, for each identified hazardous access point, a likelihood and severity of injury that can result if an operator improperly interacts with the access point. In general, the goal of the risk assessment is to assess the level of risk associated with an access point and decide whether the level of risk is such that work can be performed safely. The risk assessment can determine a required performance level (PLr) for each access point that defines a minimum degree of safety equipment performance and risk mitigation capability that satisfies the prescribed safety standards (e.g., ISO or IEC standards) given a likelihood and severity of the risk.

Based on the results of the risk assessment, the designer then designs a safety solution for the hazardous access point that achieves the required performance level. This requires the designer to possess a working understanding of current safety standards and how those standards should be applied to their own automation system. With these standards in mind, the designer must then select suitable input, logic, and output devices for each required safety function in accordance with the standards. Typically, the designer selects these devices from one or more vendor catalogs based on their understanding of the prescribed requirements. Finally, once the safety devices have been specified and a safety function configuration has been designed, the resulting safety function must be submitted for design verification to confirm that the design satisfies the required performance level determined by the risk assessment. Design verification can be carried out by manual assessment of the safety function, or by entering information about the safety function into a performance level verification tool that calculates the performance level achieved by the safety function and confirms that the design complies with the standards.

This process of translating the results of the risk assessment into a compliant safety function design and verifying the design prior to implementation can be complicated and time-consuming. Moreover, if the designer lacks sufficient knowledge of the prevailing safety standards, the resulting safety function design may fail the initial performance level verification, necessitating a redesign of the safety function. Accordingly, one or more embodiments of the present disclosure relate to a safety automation builder that automates much of the product selection, safety function design, and verification processes.

FIG. 1 illustrates a general overview of the conceptual relationship between risk assessment, design verification, and the safety automation builder of the present disclosure. In general, a safety system designer can interact with the safety automation builder 106 to identify hazardous access points in the automation line or machine and specify required performance levels for each access point based on results of the risk assessment 102. The safety automation builder 106 implements a workflow that guides the user through the process of building compliant safety functions for each identified access point. To simplify the design process, the safety automation builder can access a comprehensive library of input, logic, and output safety devices and present the user with a filtered subset of devices that satisfy the application criteria provided by the user. Once all necessary safety functions have been specified, safety automation builder 106 can automate the final step of the process—design verification 104—by exporting the resulting safety function data to an external performance level verification tool for confirmation that the resulting safety function designs will achieve the required performance levels for each access point dictated by the industrial safety standards.

Figure 2:
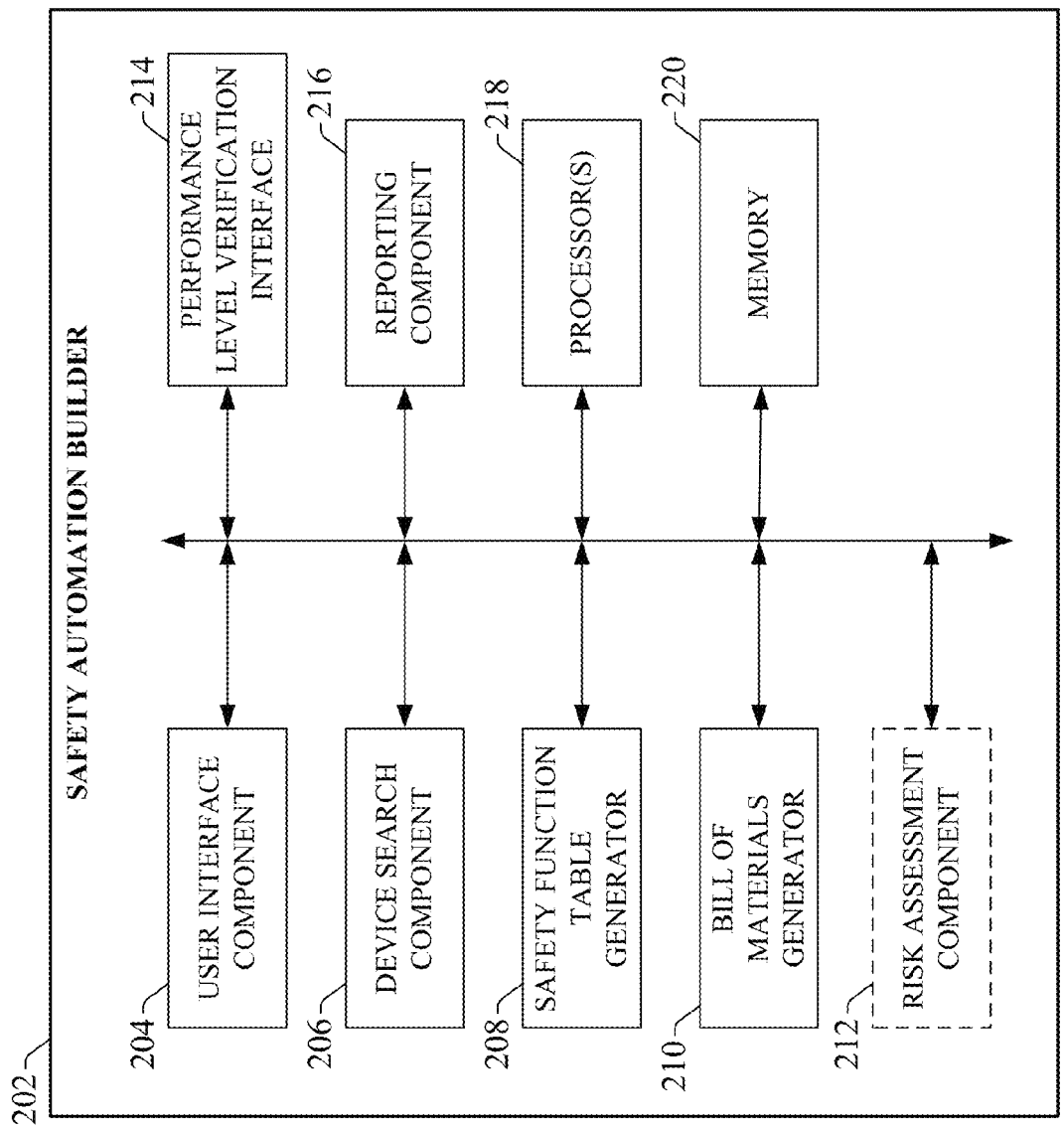
FIG. 2 is a block diagram of an exemplary safety automation builder that can facilitate guided safety system design in accordance with prescribed safety standards.

FIG. 2 is a block diagram of an exemplary safety automation builder that can facilitated automated, guided safety system design in accordance with prescribed safety standards. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

One or more embodiments of safety automation builder 202 can include a user interface component 204, a device search component 206, a safety function table generator 208, a bill of materials generator 210, a risk assessment component 212, a performance level verification interface 214, a reporting component 216, one or more processors 218, and memory 220. In various embodiments, one or more of the components 204-216, the one or more processors 218, and memory 220 can be electrically and/or communicatively coupled to one another to perform one or more of the functions of the safety automation builder 202. In some embodiments, components 204-216 can comprise software instructions stored on memory 220 and executed by processor(s) 218. The safety automation builder 202 may also interact with other hardware and/or software components not depicted in FIG. 2. For example, processor(s) 218 may interact with one or more external user interface devices, such as a keyboard, a mouse, a display monitor, a touchscreen, or other such interface devices.

User interface component 204 can be configured to receive user input and to render output to the user in any suitable format (e.g., visual, audio, tactile, etc.). User input can be, for example, risk assessment data, device selection input, user responses to prompts provided by the user interface component 204, or other such data. Device search component 206 can be configured to access a library of input, logic, and output safety device and retrieve a filtered subset of devices that satisfy a set of safety function criteria provide by the user via user interface component 204. Safety function table generator 208 can be configured to tabulate the safety devices included in the safety functions designed using the safety automation builder 202. The resulting table can include information required by an external performance level verification system to calculate the performance levels that will be achieved by the respective safety functions.

Bill of materials generator 210 can generate and output a bill of materials documenting the safety devices used in the resulting safety function designs. The bill of materials can include such data as a catalog number, a description, and pricing information for each listed device. Performance level verification interface 214 can be configured to exchange data with an external performance level verification tool (not shown). For example, data tabulated by the safety function table generator 208 can be exported to the performance level verification tool via performance level verification interface 214 so that the verification tool can calculate a performance level achieved by each safety function specified in the safety function table. Subsequently, performance level verification interface 214 can receive report data from the performance level verification tool that specifies an achieved performance level for each safety function and confirms whether the components, structures, and designs meet the required performance level dictated by the prevailing safety standards.

Reporting component 216 can be configured to generate documentation for the designed safety functions. Such reports can include, for example, a validation report based on the verification results received by the performance level verification interface 214, a hierarchical safety function tree that organizes the safety devices in use according to line, zone, access point, etc., or other such reports. Optionally, safety automation builder 202 can also include risk assessment component 212, which can be configured to guide the user through the risk assessment process for their automation line or machine and calculate a required performance level for each identified hazardous access point. The one or more processors 218 can perform one or more of the functions described herein with reference to the systems and/or methods disclosed. Memory 220 can be a computer-readable storage medium storing computer-executable instructions and/or information for performing the functions described herein with reference to the systems and/or methods disclosed.

Figure 3:
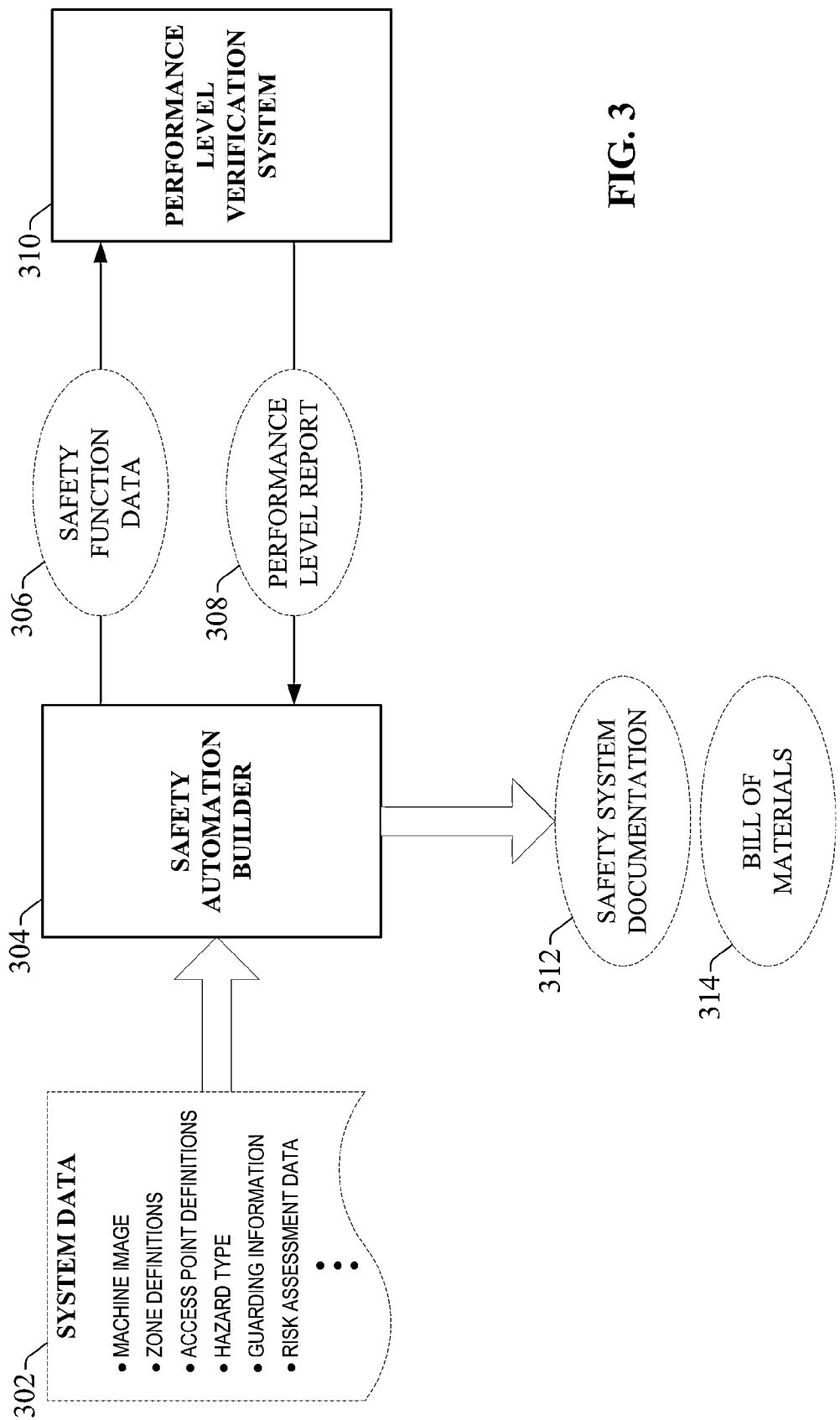
FIG. 3 is a block diagram illustrating general exemplary data flows relative to the safety automation builder.

FIG. 3 is a block diagram illustrating general exemplary data flows relative to the safety automation builder. As will be explained in more detail below, safety automation builder 304 can guide the user through a design workflow that simplifies design and verification of compliant safety functions. During the design process, the user will be prompted to enter various items of system data 302 relating to the system (e.g., automation line or machine) to be protected. Initially, when a new project is created, safety automation builder 304 allows the user to import an image representing the line, machine, or production area for which one or more safety functions are required. This image can comprise, for example, a representation of an engineering drawing depicting an overview of the line or machine. During subsequent design steps, some items of system data 302 can be entered into the safety automation builder 304 through interaction with the imported image, thereby providing an intuitive interface for defining the locations of zones, access points, guarding, safety devices, etc.

Once the system image has been imported, safety automation builder 304 can guide the user though the process of entering additional system data 302 required by the system. For example, the user can enter zone definitions that delineate and name one or more zones that make up the automation system. These zone definitions can be defined graphically through interaction with the system drawing previously imported into the safety automation builder 304. Similarly, the user can also locate and name one or more hazardous access points for which a safety function is required, as well as a type of hazard (e.g., cutting, crushing, impact, flying debris, etc.) associated with each access point. Information regarding the location and type of guarding in place can also be provided to the safety automation builder 304 through interaction with the system drawing. For each defined access point, the user will also be prompted to provide risk assessment data previously collected as part of a general risk assessment. This risk assessment data can comprise, for example, a required performance level (PLr) or safety category for each access point. The required performance level and/or category can be dictated by the industrial safety standards (e.g., ISO or IEC standards) based on such criteria as a type of risk, a probability of injury, a possibility of avoiding injury, or other such factors.

As the various access points and associated risk assessment information (e.g., required performance levels) are defined for a given project, safety automation builder 304 will assist the user in selecting suitable combinations of input, logic, and output safety devices for reducing the risk associated with each access point in accordance with the required performance level. The configuration of an input safety device, a logic safety device, and an output safety device for mitigating risk associated with an access point is referred to herein as a safety function. Safety automation builder 304 allows one or more safety functions to be configured for each access point defined by the user, and guides the user through the process of selecting suitable input, logic, and output safety devices for each defined safety function in accordance with the industrial safety standards.

Once all access points, safety functions, and associated safety devices have been defined for the project, safety automation builder 304 can leverage this data for a variety of functions. For example, safety automation builder 304 can export the list of selected safety devices into a bill of materials that itemizes the selected safety devices, including catalog numbers, device specifications, and pricing information. Safety automation builder 304 can also use the project data to generate other forms of safety system documentation 312, including but not limited to line drawings on which hazardous access point identifiers and safety devices are superimposed.

Moreover, portions of the safety system data 302 entered and/or generated for the project can be exported to a separate performance level verification system 310, which can carry out performance level calculations on the defined safety functions and their associated safety devices to determine an actual performance level achieved by each safety function. These calculated performance levels can be compared with the required performance levels for each access point to determine whether the resulting safety function designs comply with the prescribed safety standards. By compiling and exporting the safety function data 306 required by performance level verification system, safety automation builder 304 eliminates the need to manually populate the data entry fields of the performance level verification system 310, significantly reducing the time and effort required to verify a safety function design using conventional methods. In some embodiments, safety automation builder 304 can subsequently receive a performance level report 308 from performance level verification system 310 for presentation to the user via the safety automation builder's interface. The workflow described above in connection with FIG. 3 is described in more detail below.

Figure 4:
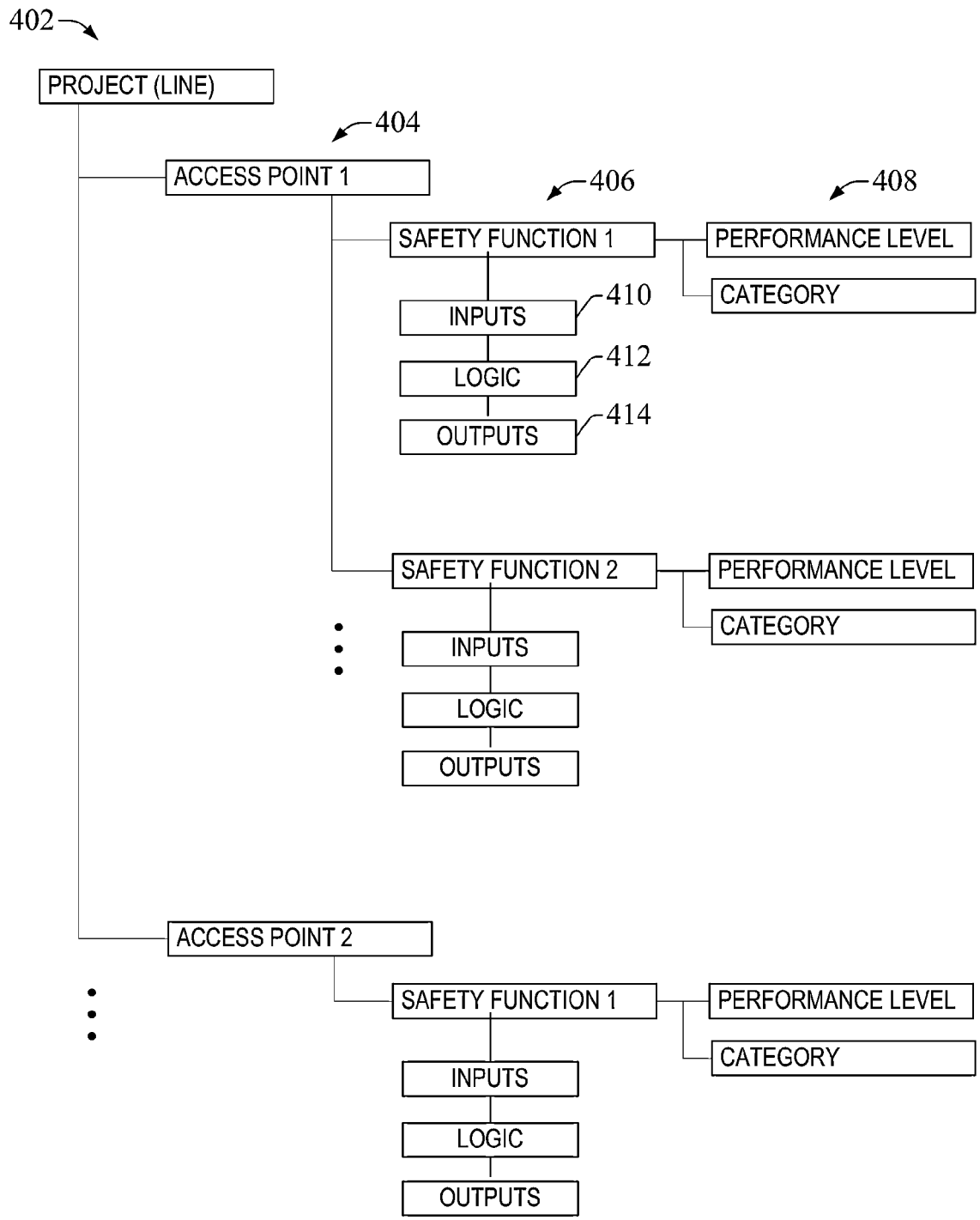
FIG. 4 illustrates a hierarchical representation of key project elements that are configurable within the safety automation builder.

FIG. 4 is a hierarchical representation of some of the key project elements that are configurable by the user with guided assistance from safety automation builder 304. It is to be appreciated that the hierarchy of FIG. 4 is only intended to illustrate certain design elements that can be configured using the safety automation builder, and that some embodiments of the safety automation builder may include options to configure additional elements at substantially any desired degree of granularity.

For a given project 402, which can represent a particular automation line, machine, manufacturing area, or the like, the safety automation builder can prompt the user to define one or more access points 404 present on the line. These access points 404 represent areas that expose an operator to dangerous machinery or that otherwise pose a risk of injury if the operator improperly interacts with the access point. An exemplary access point may comprise a manual loading station into which an operator hand-loads parts into a stamping press. The press may be operated using dual buttons mounted near the station to ensure that both of the operator's hands are clear of the stamping area when the press is activated. However, there may still be a degree of risk each time the operator reaches through the access point, since it may be possible for maintenance personnel to bypass normal operation of the press without the operator's knowledge. Another exemplary access point may comprise a section of a conveyor line that, if the access point is improperly breached by an operation, may trap the operator's fingers under a conveyor roller. The safety automation builder can allow the user to select a location of each access point 404 on the imported system drawing, name the access point, specify the type of hazard associated with the access point (e.g., crushing, burning, entrapment, etc.), or provide other such information.

For each access point 404 defined by the user, the safety automation builder will guide the user through the process of designing one or more safety functions 406 to mitigate the risk associated with the access point. The safety automation builder allows the user to name each safety function 406 and to assign a required performance level and/or category 408 to each safety function 406. The performance level and/or category 408 of a safety function 406 represents a classification of the safety function in terms of its ability to tolerate faults and to perform a required safety function under foreseeable conditions. In general, the required performance level or category of a safety function to be implemented for a hazardous access point is dictated by industrial safety standards (e.g., ISO or IEC standards). The required performance level and/or category 408 for a given access point may be determined by a risk assessment performed on the automation line or machine prior to creating project 402 in the safety automation builder. Alternatively, one or more embodiments of the safety automation builder described herein may include a risk assessment tool (e.g., risk assessment component 212 of FIG. 2) that can guide the user through the process of determining the required performance level or category 408 for a particular access point.

Figure 5:
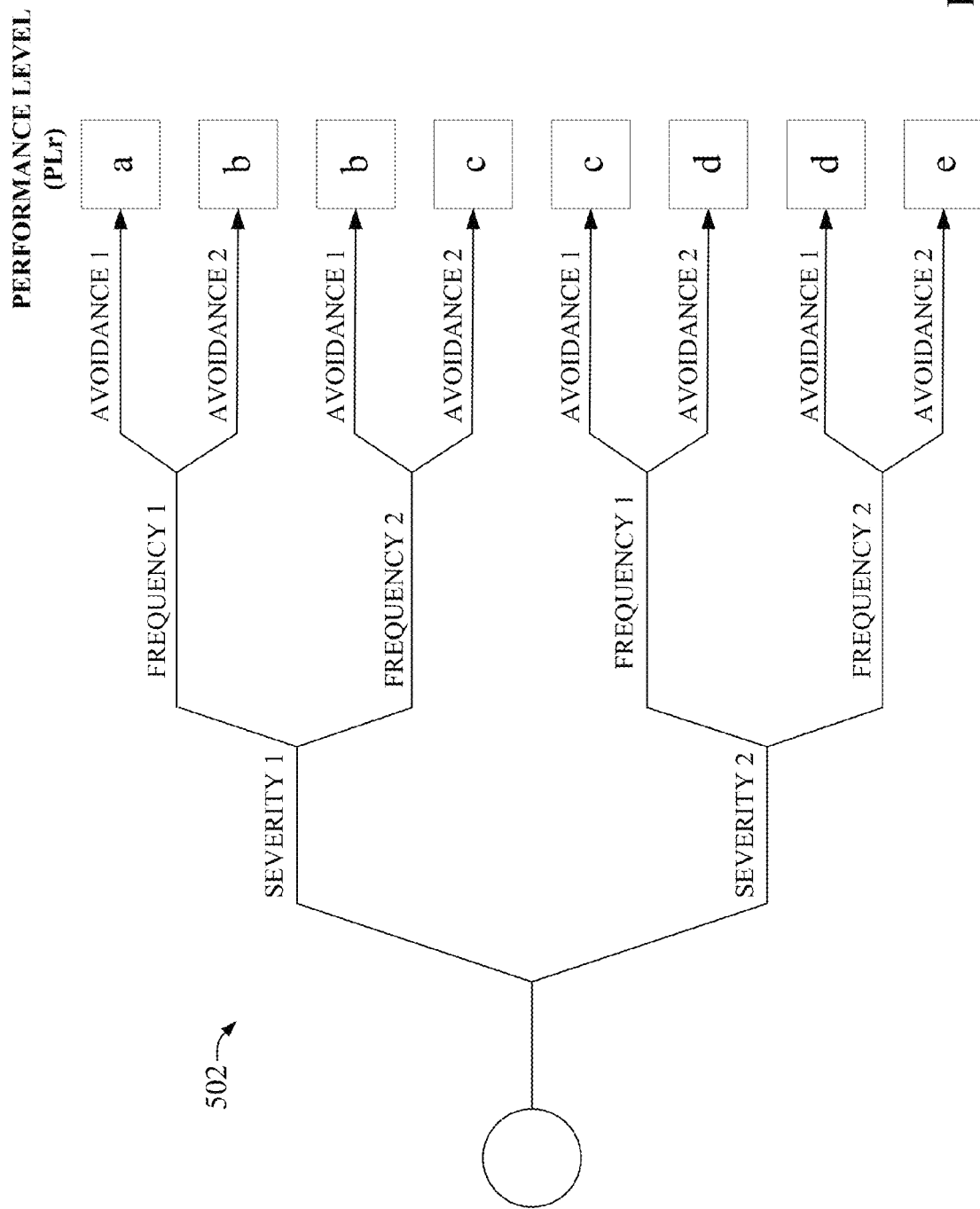
FIG. 5 illustrates a risk graph used to determine a required performance level for a given hazardous access point.

The required performance level and/or category 408 for a given access point 404 can be determined based on characteristics of the risk associated with the access point. For example, the EN ISO 13849-1 standard defines five performance levels ("a" through "e") defining respective five levels of system reliability and capability. The risk graph used to determine which of these performance levels is required for a given access point is depicted in FIG. 5. As illustrated in risk graph 502, the required performance level is a function of severity of injury that can result from improper interaction with the access point, a frequency of exposure to the risk, and a possibility of avoiding the injury. By running these factors through risk graph 502, the required performance level (PLr) can be ascertained. Although ISO performance levels are depicted in FIG. 5, it is to be appreciate that some embodiments of the safety automation builder may allow other types of safety system ratings to be specified (e.g., IEC safety integrity levels).

Returning now to FIG. 4, once an access point 404 has been defined for the project and a safety function 406 with a specified performance level and/or category 408 has been created, the input device 410, logic device 412, and output device 414 must be specified for the safety function. A safety function typically comprises at least one input device to detect a user action requiring a safety countermeasure to be performed (e.g., a light curtain, a pressure mat, an interlock switch, etc.), at least one output device for generating an output that triggers the safety action (e.g., a safety contactor for isolating power to a hazardous device, a variable frequency drive with integrated safety functionality, etc.), and a logic device for controlling the output device based on signaling received from the input device (e.g., a programmable safety controller, a safety relay, etc.). These safety devices must be selected and configured such that the resulting safety function meets the required performance level and/or category 408 specified for the safety function 406.

To assist designers who may not have sufficient working knowledge of the prevailing safety standards and how those standards determine product selection, the safety automation builder can present the user with a list of suitable input devices, logic devices, and output devices for each defined safety function based on the system data provided by the user (e.g., the performance level, the hazard type, the safety function type, etc.). To this end, the safety automation builder can include (or can remotely access) a library of input, output, and logic safety devices. For each defined safety function 406, safety automation builder can search this library using portions of the system data 302 provided by the user as search criteria, and retrieve a filtered subset of input, output, and logic devices suitable for the particular hazard and required performance level defined for the access point.

Figure 6:
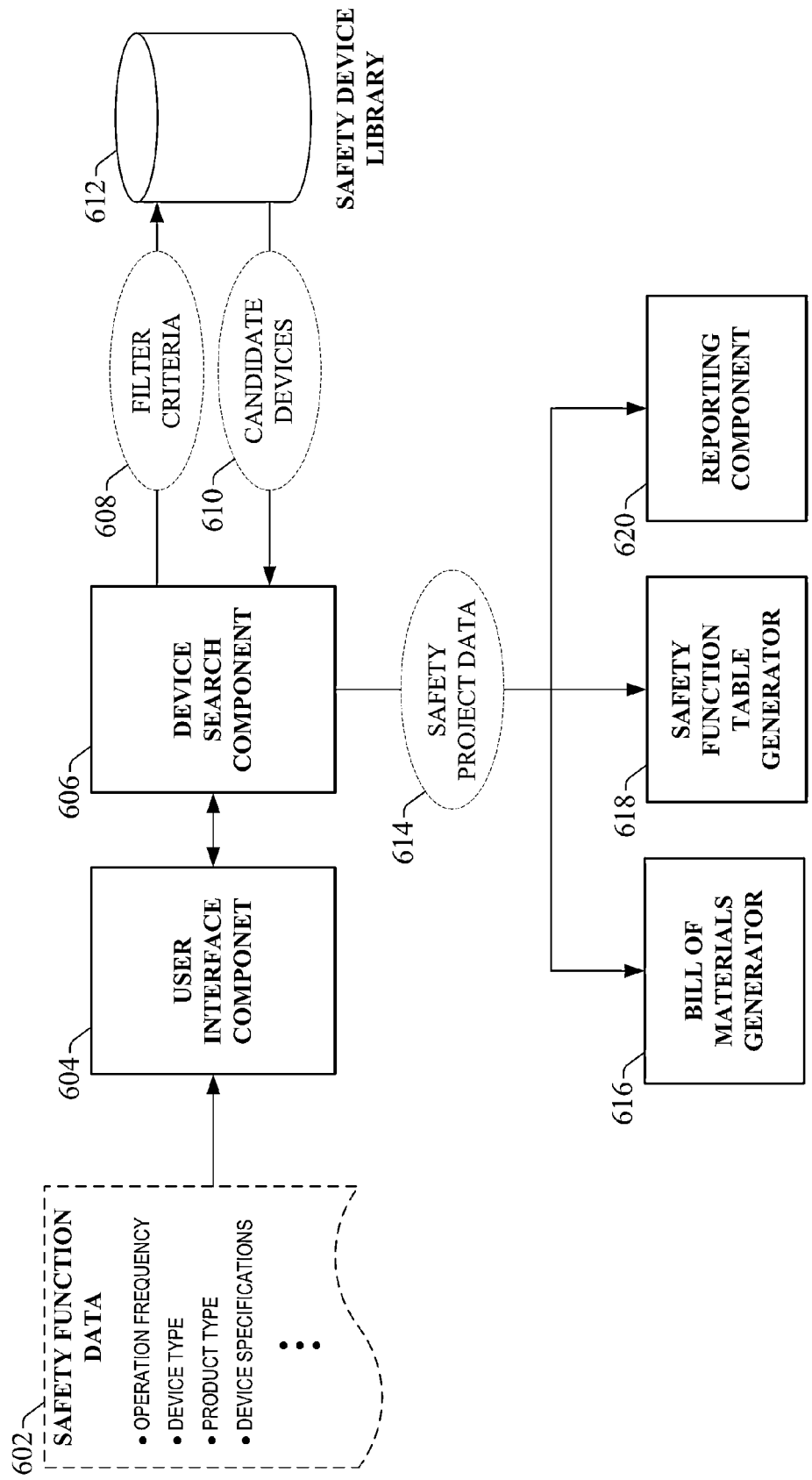
FIG. 6 is a block diagram illustrating guided device selection and safety function reporting using the safety automation builder.

This guided device selection process is described in more detail in connection with FIG. 6. After the user has defined an access point (e.g., item 404 of the data hierarchy of FIG. 4), created a new instance of a safety function for the access point (e.g., item 406 of FIG. 4), and specified a required performance level and/or category for the safety function (e.g., item 408 of FIG. 4), the safety automation builder will prompt the user, via user interface component 604, to enter safety function data 602 to be used as criteria for selection of a suitable input safety device for the safety function. Safety function data 602 can include data regarding an expected operational frequency of the safety system. For example, the safety automation builder interface may provide an input field for entering an Operations per Hour value, an Hours per Day value, and a Days per Year value for the safety function. Based on the values entered for these parameters, safety automation builder can calculate an expected number of operations per year, providing the safety automation builder with a measure of the expected rate of wear on the input safety device. The operation frequency may have a bearing on which safety device is selected by the safety automation builder, since the reliability and lifecycle of a device may degrade more quickly as a function of operational frequency. Consequently, in order to satisfy a required performance level, the safety automation builder may select a device rated to be more resistant to reliability degradation if the user enters a relatively high operating frequency.

Other safety function data 602 provided by the user can include a type of input device and/or a product type. For example, the safety automation builder may prompt the user to indicate whether the desired type of input device is a separating device (e.g., a fence or gate), a non-separating device (e.g., a light curtain or pressure mat), or an operator device (e.g., an emergency stop button or pull-cord). Based on the user's selection, the safety automation builder may prompt the user for additional device specifications to facilitate narrowing the set of devices to a smaller subset that satisfies the entered criteria and required performance level. It is to be appreciated that the types of safety function data 602 described above are only intended to be exemplary, and that embodiments of the safety automation builder can incorporate design workflows that prompt the user for any suitable combination of safety function data relevant to selection of a suitable input safety device.

Based on the safety function data 602 provided by the user under the guidance of the safety automation builder, the device search component 606 generates filter criteria 608 representing the criteria specified by the safety function data 602 (as well as the required performance level previously entered for the safety function). Device search component 606 submits the filter criteria 608 to a safety device library 612 containing specification data for a range of input, output, and logic safety devices. In one or more embodiments, safety device library 612 can store, for each device, such information as catalog number, device description, device specifications, current pricing information, connector information, or other such device information. In one or more embodiments, safety device library 612 can reside locally relative to the safety automation builder (that is, the library can be installed on the local computing device that executes the safety automation builder). Alternatively, safety device library 612 can reside at a remote location accessible by the safety automation builder. For example, safety device library 612 may reside on a web server accessible via an Internet connection. In another example, safety device library 612 may reside on cloud-based storage accessible by cloud-capable devices having appropriate access privileges (e.g., based on a subscription service). By maintaining safety device library 612 on a web server or cloud platform for centralized access by multiple clients, the safety device data stored in the library can be kept current by product vendors having write access privileges to the library, as will be described in more detail below.

In response to submission of filter criteria 608, safety device library 612 returns a filtered subset of candidate devices that satisfy the requirements encoded in filter criteria 608. In one or more embodiments, the safety automation builder may guide the user in a step-wise manner through the process of narrowing the total set of available devices down to a filtered subset of candidate devices 610. For example, after a new access point and associated safety function have been instantiated in the safety automation builder, the user may be prompted to select the desired device type for the safety function's input safety device (e.g., separating, non-separating, or operator device). Upon selecting "non-separating" as the device type, the safety automation builder may present the user with a first filtered set of input devices that satisfy the selected "non-separating" device type category as well as the required performance level and operational frequency previously defined for the safety function. The safety automation builder may present this first filtered set in a categorized and/or hierarchical list (e.g., organized by vendor, product type, or device specification categories). The user may then either select a particular device from this first filtered list, or select a sub-category from the organized list to yield a second list filtered according to the selected sub-category. In this manner, one or more embodiments at the safety automation builder can allow the user to browse a hierarchy of device categories until a suitable input safety device is selected. By prompting the user for known system requirements and presenting the user with one or more filtered lists of candidate devices satisfying those requirements, the safety automation builder drives the user toward a suitable safety input device for inclusion in the user's safety function. Moreover, the safety automation builder selects the filtered set of candidate devices 610 based on encoded knowledge of the prevailing industrial safety standards, such that the candidate devices 610 returned to the user are known to satisfy the required performance level in view of the operational frequency entered by the user. In this way, the safety automation builder substantially automates compliance with the industrial safety standards and reduces the burden on the designer to be conversant with the industrial safety standards when designing the safety system.

After the user has selected a suitable safety input device using the techniques described above, the safety automation builder assists the user to select a safety logic device and a safety output device for the defined safety function in a similar manner. As with the safety input device, the safety automation builder will prompt the user for selection criteria to facilitate identification of suitable logic and output safety devices from the safety device library 612.

Returning now to the hierarchical representation of project elements in FIG. 4, the selected input, logic, and output safety devices are represented as elements 410, 412, and 414, respectively. As illustrated in FIG. 4, completion of the guided workflow described above yields a safety project 402 comprising one or more defined access points 404 representing the hazardous access points of the automation system, one or more defined safety functions 406 having respective required performance levels and/or categories 408, with each safety function 406 comprising one or more input devices 410, logic devices 412, and output devices 414. Once all access points for a project have been defined and all safety functions have been designed (including specification of all input, logic, and output devices), the safety automation builder can leverage the compiled project data in a number of ways. For example, returning to FIG. 6, safety project data representing the safety project hierarchy of FIG. 4 can be provided to a bill of materials generator 616 (similar to bill of materials generator 210 of FIG. 2), which can create a bill of materials listing the safety devices to be used on the line. In one example, the resulting bill of materials can list the input, output, and logic safety device specified for all defined safety functions, and can include for each device such information as catalog number, device quantity, description, pricing information, product availability data, or other such information. The bill of materials can be used as a guide for purchasing the specified safety devices. An exemplary bill of materials that can be created by bill of materials generator 616 is illustrated in FIG. 7.

The safety project data 614 can also be provided to a safety function table generator 618 (similar to safety function table generator 208 of FIG. 2), which can use the data to populate a safety function table for the project. An exemplary safety function table 802 is illustrated in FIG. 8. Safety function table 802 lists the safety functions defined for the project, and includes columns for the safety function symbol and name; the input, output, and logic devices selected for each safety function; the required performance level (PLr) specified for each safety function; and the expected operational frequency of the safety function (e.g., number of operations per year).

In one or more embodiments, the data tabulated in safety function table 802 can correspond to the data required by a separate performance level verification system to determine whether each safety function will achieve the required performance level dictated by the prescribed industrial safety standards. Conventionally, this data must be entered into such performance level verification systems manually. However, the safety automation builder can include an export function that allows the data tabulated in safety function table 802 (based on the information provided by the user under the guidance of the safety automation builder) to be exported to appropriate fields of the performance level verification system (e.g., performance level verification system 310 of FIG. 3), greatly simplifying the process of designing and verifying safety system components for a given automation system. In this regard, the safety automation builder can be configured to map the columns of safety function table 802 to corresponding data fields of the performance level verification system. When the export feature is initiated, the data in the columns of safety function table 802 can be exported to the corresponding fields of the performance level verification system to which they are mapped.

Returning to FIG. 6, the safety project data 614 can also be provided to a reporting component 620 (similar to reporting component 216 of FIG. 2), which can be configured to generate other forms of safety system documentation based on the safety project data. Such documentation can include, for example, enhanced system drawings comprising the automation system image initially imported into the safety automation builder, with all or portions of the safety project data superimposed thereon. For example, the enhanced system drawings can include indicators labeling each identified access point with a hazard-specific marker, images of the safety devices to be installed on the system, drawings of safety guarding added to the original image, or other such documentation.

To illustrate the features described above, FIGS. 9-19 depict a series of exemplary safety automation builder interface screens that can be presented to the user to facilitate guided safety function design. It is to be appreciated, however, that these interface screens are only intended to be exemplary, and that any interface screen layouts suitable for guiding the user through the workflow described above are within the scope of one or more embodiments this disclosure.

Figure 9:
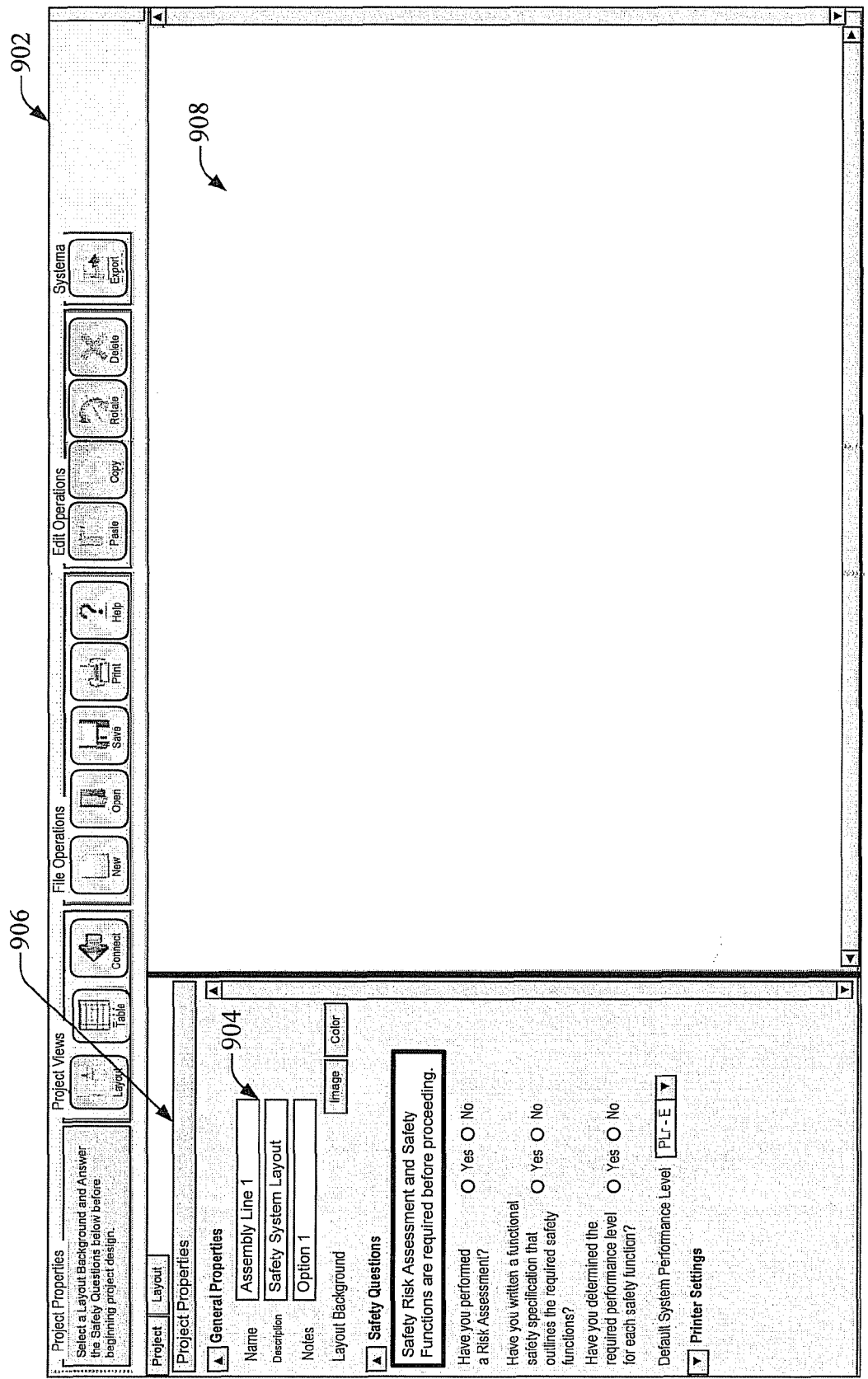
FIG. 9 illustrates an exemplary safety automation builder interface screen in which general project properties are set.

FIG. 9 depicts an initial view 902 presented to the user when a new project is created. This initial view 902 includes a Project Properties area 906 and a layout area 908. In the General Properties fields 904, the user can enter a project name, which may correspond to the name of the automation line, machine, or production area for which the safety functions are to be designed (e.g., "Assembly Line 1"). The user can also enter a description of the project and any additional notes to be associated with the project.

Figure 10:
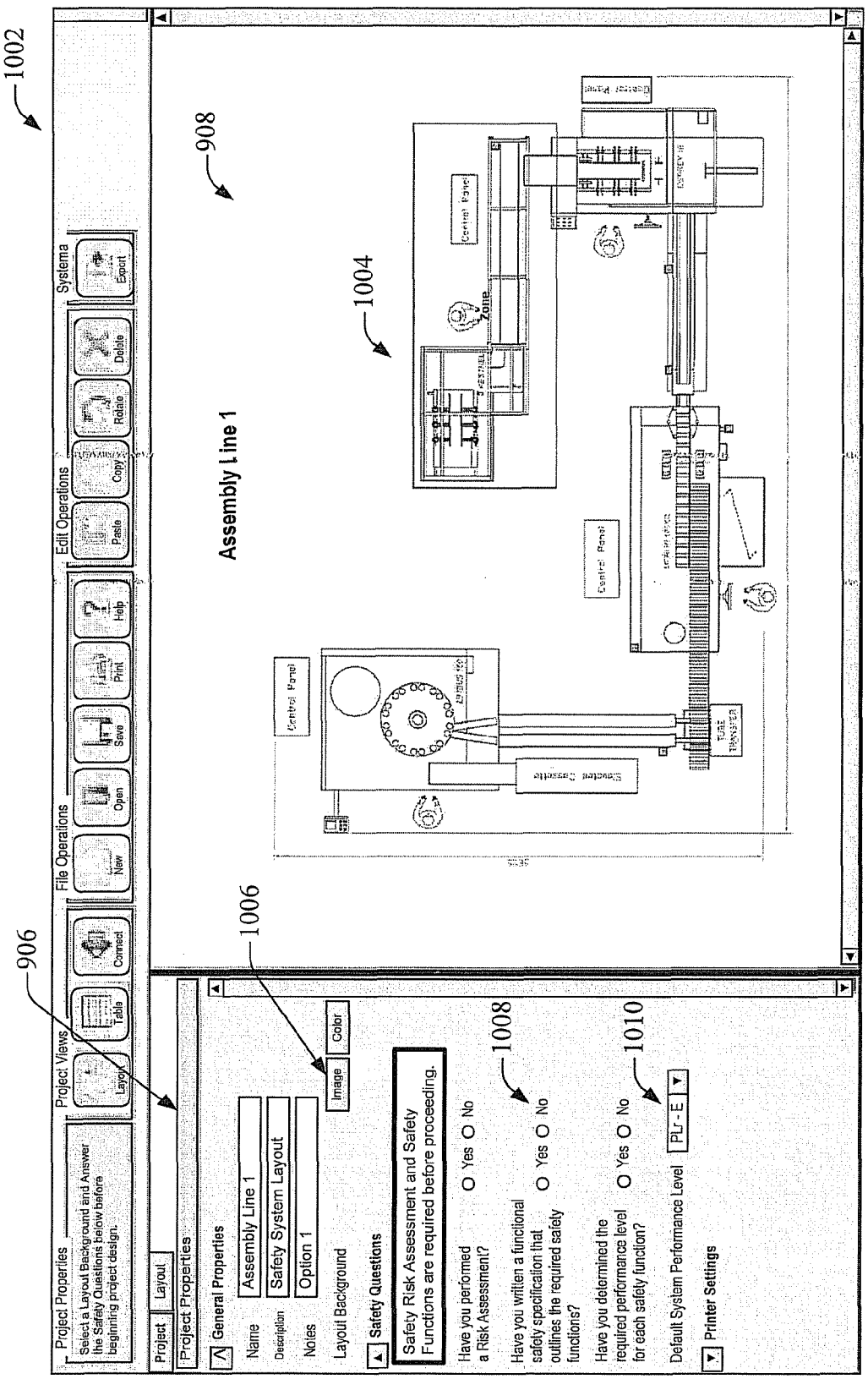
FIG. 10 illustrates an exemplary safety automation builder interface screen in which an image of an assembly line has been imported.

Turning to FIG. 10, once the project is created, the user can import a custom image 1004 of the line for which the safety functions are to be designed. For example, clicking on the Image button 1006 can open a browsing window that allows the user to browse to and select the desired custom image to be imported. The imported image will appear in the layout area 908. Once imported, the safety automation builder can automatically scale the image 1004 to match the resolution of the interface. The image can be, for example, a machine elevation drawing of the line in any suitable format (e.g., .jpg, .gif, AutoCAD, etc.).

Next, the safety automation builder can present a number of safety questions 1008 determined to ascertain whether the user has performed a preliminary risk assessment on the line. For embodiments in which the safety automation builder does not include an integrated risk assessment tool, the user is encourages to perform such a risk assessment prior to developing a safety system project, since the safety automation builder must know the required performance levels needed for each access point per the prescribed industrial safety standards. Accordingly, safety questions 1008 can inquire whether the user has performed a risk assessment, whether the user has written (or has access to) a function safety specification outlining the required safety functions, and/or whether the user has determined the required performance levels for each required safety function. In one or more embodiments, if the user selects "No" for the question of whether a risk assessment has been performed, the safety automation builder can present a warning message recommending that the user design the system according to the highest performance level or category (e.g., PLe). Answering "No" to the question of whether a functional safety specification has been written can cause the safety automation builder to display one or more disclaimers regarding any safety function developed using the builder without first developing a functional safety specification, but will allow the user to proceed with the safety function design nevertheless. Alternatively, the safety automation builder may not allow the user to proceed to the next steps of the design process unless all questions have been answered affirmatively.

As noted above, one or more embodiments of the safety automation builder can include integrated risk assessment tools that assist the user in determining required safety levels for all hazardous access points on a line. In such embodiments, the safety automation builder can forego safety questions 1008, and can instead guide the user through the risk assessment steps to facilitate identification of the safety functions required for the line and corresponding performance levels required for each safety function in accordance with the industrial safety standards.

The Project Properties area 906 can also include a Default System Performance Level field 1010, in which the user can set a default required performance level for the system. When a required performance level is set in field 1010, the required performance level fields on subsequent safety function development screens will automatically be populated with this default performance level.

Figure 11:
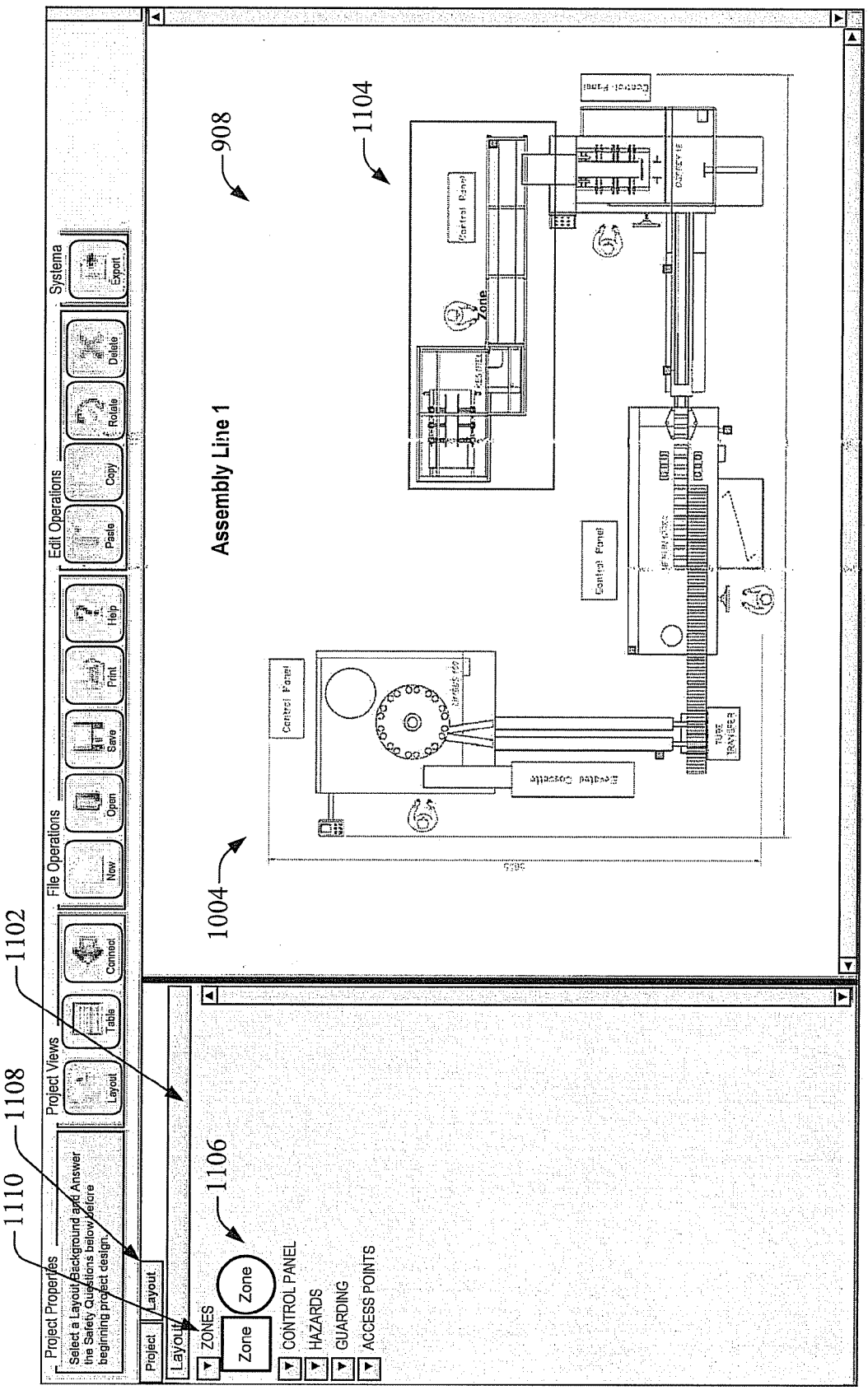
FIG. 11 illustrates an exemplary safety automation builder interface screen for defining zones of an assembly line.

Next, with reference to FIG. 11, the user can begin configuring the safety functions for the project by clicking on the Layout tab 1108, which displays the layout area 1102. If desired, the user can delineate the line or machine into zones. Clicking on the "Zones" drop-down 1110 displays two zone delineators 1106 which can be dragged into the layout area 908 and superimposed on the custom image 1004. As depicted in FIG. 11, a square zone delineator 1104 has been dragged onto the custom image from the "Zones" drop-down 1110 to define a first zone of Assembly Line 1. Once placed on the custom image 1004, the zone delineator 1104 can be resized and/or rotated by the user through graphic manipulation until the zone is properly described. The safety automation builder allows the user to name each zone as it is created. The zone information defined in this step can be used by the safety automation builder for reporting purposes (e.g., organizing safety function information according to the respective zones).

Figure 12:
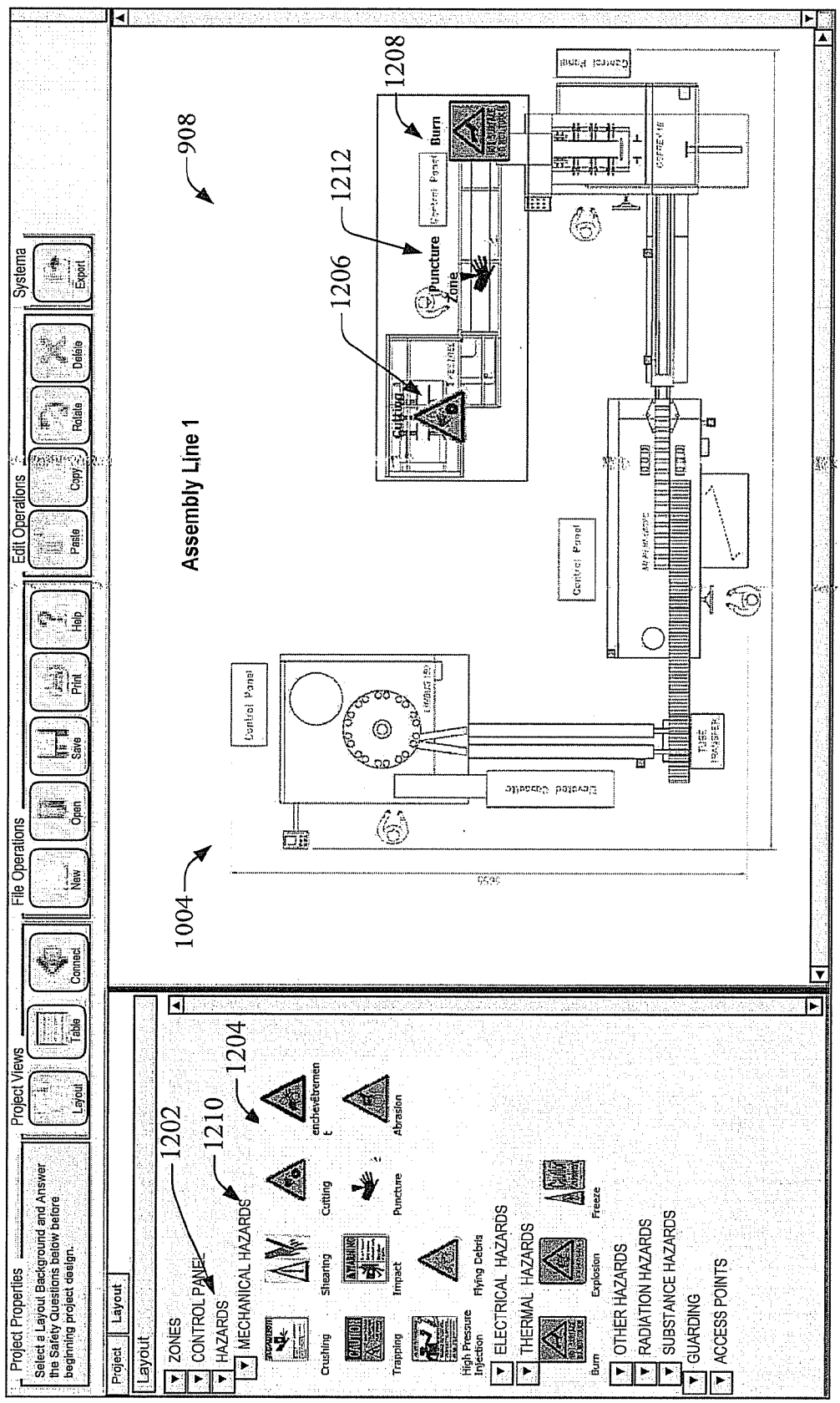
FIG. 12 illustrates an exemplary safety automation builder interface screen for defining hazards of an assembly line.

Once the zones have been defined, the user can identify the hazardous access points, as illustrated in FIG. 12. Clicking on the "Hazards" drop-down 1202 causes a number of hazard indicators 1204 to be displayed. The hazard indicators 1204 can be organized according to hazard type (e.g., mechanical, electrical, thermal, radiation, substance, etc.). The hazard indicators 1204 can be nested according to these hazard types, such that clicking on a hazard type drop-down (e.g., Mechanical Hazards drop-down 1210) reveals the available hazard indicators corresponding to the selected type.

The safety automation builder allows the user to drag a selected hazard indicator from the drop-down area to the layout area 908 and place the selected hazard indicator on the custom image 1004 of the line. In the present example, the user has identified three hazardous areas on the graphical representation of Assembly Line 1, and placed three hazard indicators—cutting indicator 1206, puncture indicator 1212, and burn indicator 1208—at these respective hazardous areas. The hazard indicators 1206, 1212, and 1208 can be resized in the layout area 908 as desired. The locations of the hazardous areas on which the hazard indicators should be placed can be determined based on results of the risk assessment performed prior to creating the safety function project.

Figure 13:
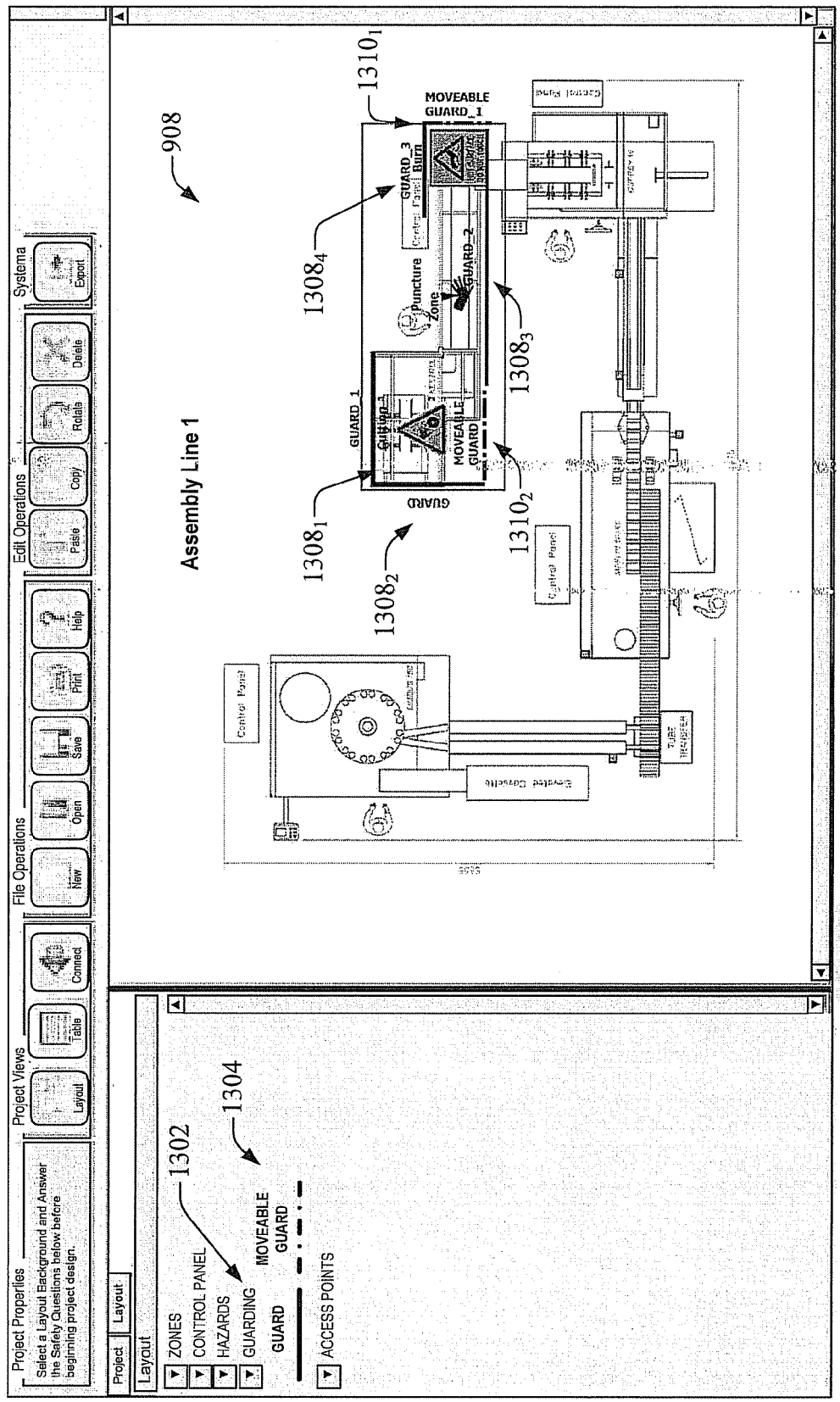
FIG. 13 illustrates an exemplary safety automation builder interface screen for defining guarding locations on an assembly line.
Figure 14:
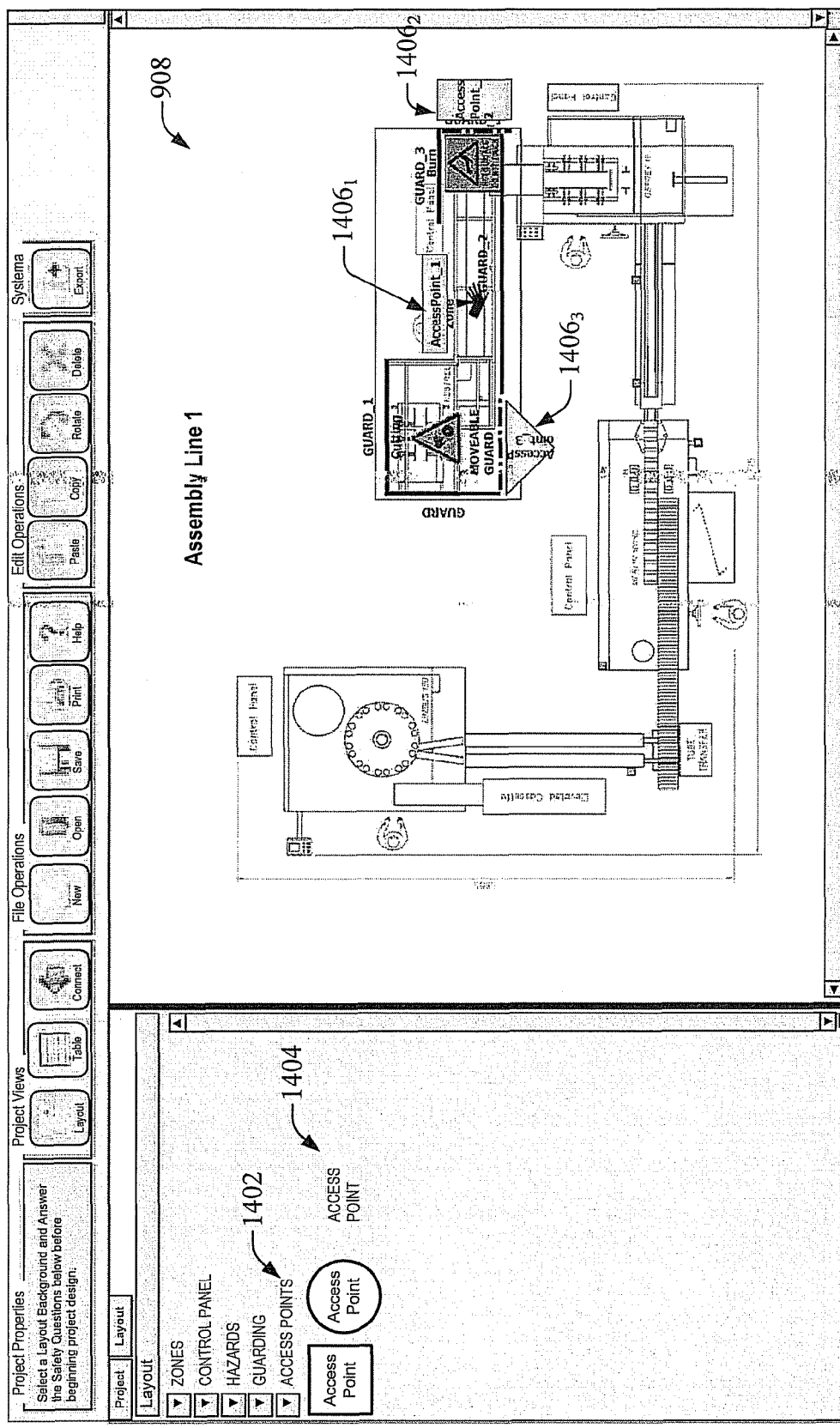
FIG. 14 illustrates an exemplary safety automation builder interface screen for identifying hazardous access points on an assembly line.

When the hazardous access points have been defined using the hazard indicators, the user can proceed to add guarding to the layout, as illustrated in FIG. 13. Clicking on the Guarding drop-down 1302 displays one or more guarding icons 1304 that can be added to the design layout. In the present example, guarding icons 1304 include a stationary guard icon and a moveable guard icon (representing, for example, a movable gate). As with the hazard indicators, the guarding icons 1304 can be dragged from the Guarding drop-down 1302 and onto the layout area 908, where the guarding graphics can be moved, resized, and rotated as needed to place the guards at the appropriate locations on the Assembly Line 1 graphical representation. In the present example, stationary guards $1308_{1-4}$ and movable guards $1310_{1-2}$ have been added to the Assembly Line 1 representation within the defined zone.

After placing the necessary guarding on the layout area 908, the user can begin defining the hazardous access points for which safety functions must be implemented. In general, an access point should be defined for each location at which operators can interact with the machine (e.g., at each movable guard and at each location where there is no guarding between the operator and the machine). To begin defining access points, the user can select the Access Points drop-down 1402 to display one or more access point icons 1404. Multiple access point icons 1404 of various shapes can be provided. To define the access points, the user can drag a selected one of the access point icons 1404 to the layout area 908, where the selected icon can be located, resized, and rotated as needed until the icon is oriented at the desired location on the Assembly Line 1 representation. In the present example, three access points $1406_{1-3}$ have been defined. Access point $1406_1$ represents a location at which there is no guarding between the user and the machine, while access points $1406_2$ and $1406_3$ are located at respective movable guards where operators are exposed to the machine if the movable guards are opened.

Figure 15:
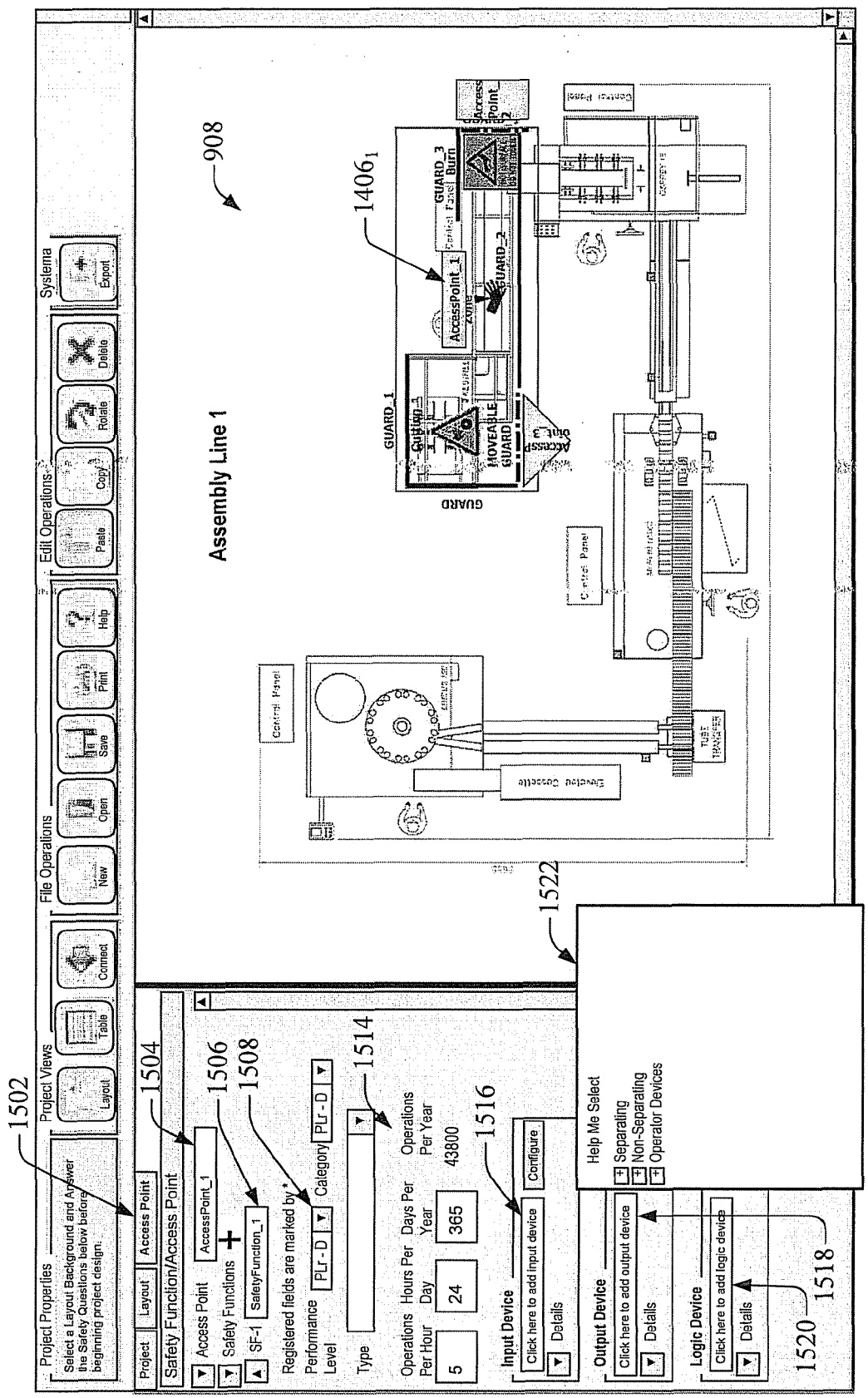
FIG. 15 illustrates an exemplary safety automation builder interface screen for selecting input, output, and logic safety devices for a selected access point of an assembly line.

As illustrated in FIG. 15, when at least one access point has been added to the layout area 908, an access point tab 1502 is enabled. Selecting access point tab 1502 displays the Safety Function/Access point configuration area, which allows the user to configure each defined access point $1406_{1-3}$ and to build one or more corresponding safety functions for each access point $1406_{1-3}$. In the illustrated example, access point $1406_1$ has been selected for configuration. The user can enter a name for the access point in the access point name field 1504 (e.g., "AccessPoint_1"), and can then proceed to configure one or more safety functions for the selected access point $1406_1$.

Selecting the green "+" icon adds a new safety function for the selected access point $1406_1$. In the present example, a default name of "SF-1" is assigned to the new safety function by the safety automation builder; however, a user-defined name for the safety function (e.g., "SafetyFunction_1") can be entered in the safety function name field 1506.

The required performance level and/or category for the new safety function can be entered in the Performance Level and Category fields 1508. The required performance level and/or category can be determined by the risk assessment performed prior to safety function development (or can be determined using an integrated risk assessment tool included in one or more embodiments of the safety automation builder). If the user has defined a default performance level in the Default System Performance Level field 1010, the default performance level will be automatically written to the Performance Level field for the safety function.

In the Type field 1510, the user can specify a type of safety function to be designed for the selected access point (e.g., emergency stop system, light curtain system, etc.). The expected operational frequency of the safety function can be entered in the Operational Frequency fields 1514. The performance level, safety function type, and operational frequency entered in these fields can be used by the safety automation builder to select a filtered subset of available safety function devices that satisfy the system requirements in view of the prescribed industrial safety standards. For example, knowing the expected operational frequency of the safety function, which can have an impact on device life-cycle and reliability, the safety automation builder can select safety devices rated to withstand the indicated operational frequency while satisfying the operational requirements dictated by the required performance level. The type of safety system indicated in the Type field 1510 can further filter this subset of devices to include only those devices corresponding to the indicated type.

Each safety function created in the safety automation builder comprises an associated input device, output device, and logic device, which work together to implement the safety function. As noted above, the safety automation builder can access a library of safety devices (e.g., safety device library 612 of FIG. 6) based on programmed knowledge of the prevailing safety standards to assist the user in selecting an appropriate set of safety devices for the safety function. Accordingly, the Safety Function/Access Point configuration window includes an Input Device field 1516, an Output Device field 1518, and a Logic Device field 1520. By interacting with these fields, the user can navigate through the set of available safety devices stored in the safety device library until a suitable device satisfying the user-defined criteria and the required performance level and/or category is selected.

Selecting Input Device field 1516 begins the process of selecting a suitable input device for the new safety function. When Input Device field 1516 is selected, an input device selection window 1522 is displayed. Input device selection window 1522 can present the user with a series of input device selection options that drive the user through a progressively narrower subset of available safety devices until a single input device is selected. In the illustrated example, input device selection window 1522 presents three categories of input devices—separating, non-separating, and operator devices—that can be selected by the user. Separating input devices are associated with safety functions that provide a physical separation between the operator and the machine, such as interlock switches that indicate whether a guard door is closed and locked. Non-separating input devices can comprise devices that detect presence of a person or object in or near the hazardous access point, but do not provide physical separation between the machine and the operator. Exemplary non-separating device can include safety light curtains and laser scanners, pressure-sensitive safety mats, and the like. Operator devices can include devices that are manually actuated by a user, such as emergency stop buttons and safety pull cords.

Upon selection of one of the categories of input devices presented on input device selection window 1522, the user may be presented with a list of input device products under the selected category that satisfy the requirements previously entered by the user (e.g., required performance level, operational frequency, safety function type, etc.). The safety automation builder selects the list of qualifying products based on a search of safety device library 612 that uses the entered safety function data as search criteria (taking into account the requirements dictated by the prescribed industrial safety standards). In some embodiments, the user may be presented with additional selection options after selection of the product category before the list of qualifying products is presented. At this stage, the list of qualifying products may only represent general product types (e.g., a particular line of safety curtain products) without yet specifying a particular catalog number for a specific device.

Figure 16:
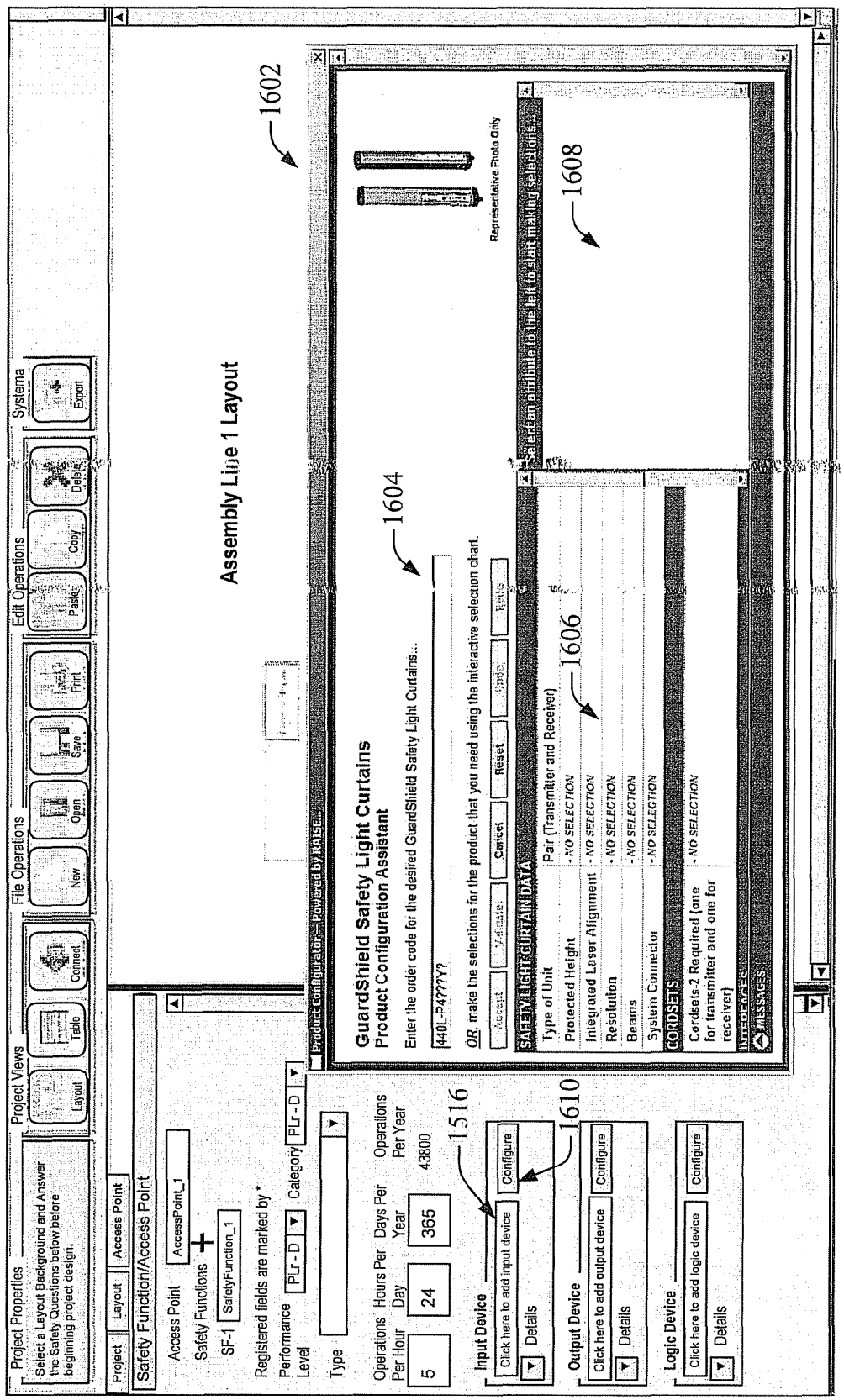
FIG. 16 illustrates an exemplary safety automation builder interface screen for specifying an input safety device for a selected access point of an assembly line.

Turning now to FIG. 16, when the user selects an input device product from the input device selection window 1522, the name of the selected product type appears in Input Device field 1516. In the present example, the user has selected GuardShield safety light curtains as the product type. To proceed with selection of a specific device from among the available GuardShield safety light curtains, the user can select the Configure button 1610 to invoke Product Configurator window 1602. If the user knows the order code for the desired safety light curtain, the order code can be entered in Order Code field 1604. Otherwise, the interactive selection chart 1606 can be used to choose selectable options that facilitate identification of suitable light curtain from the GuardShield line. In the present example, the user can select options for one or more of a height to be protected, whether the light curtain includes integrated laser alignment, a resolution, a number of beams, a type of system connector, and types of cordsets. Based on the options selected in the interactive selection chart 1606, the specific light curtain products that satisfy the entered criteria will appear in the device selection area 1608. As additional selections are made in the interactive selection chart 1606, the list of qualifying devices displayed in device selection area 1608 will gradually narrow. At any time, the user may select a desired device from the list displayed in the device selection area 1608, and the safety automation builder will accept the selected device as the input device for the safety function being configured.

Figure 17:
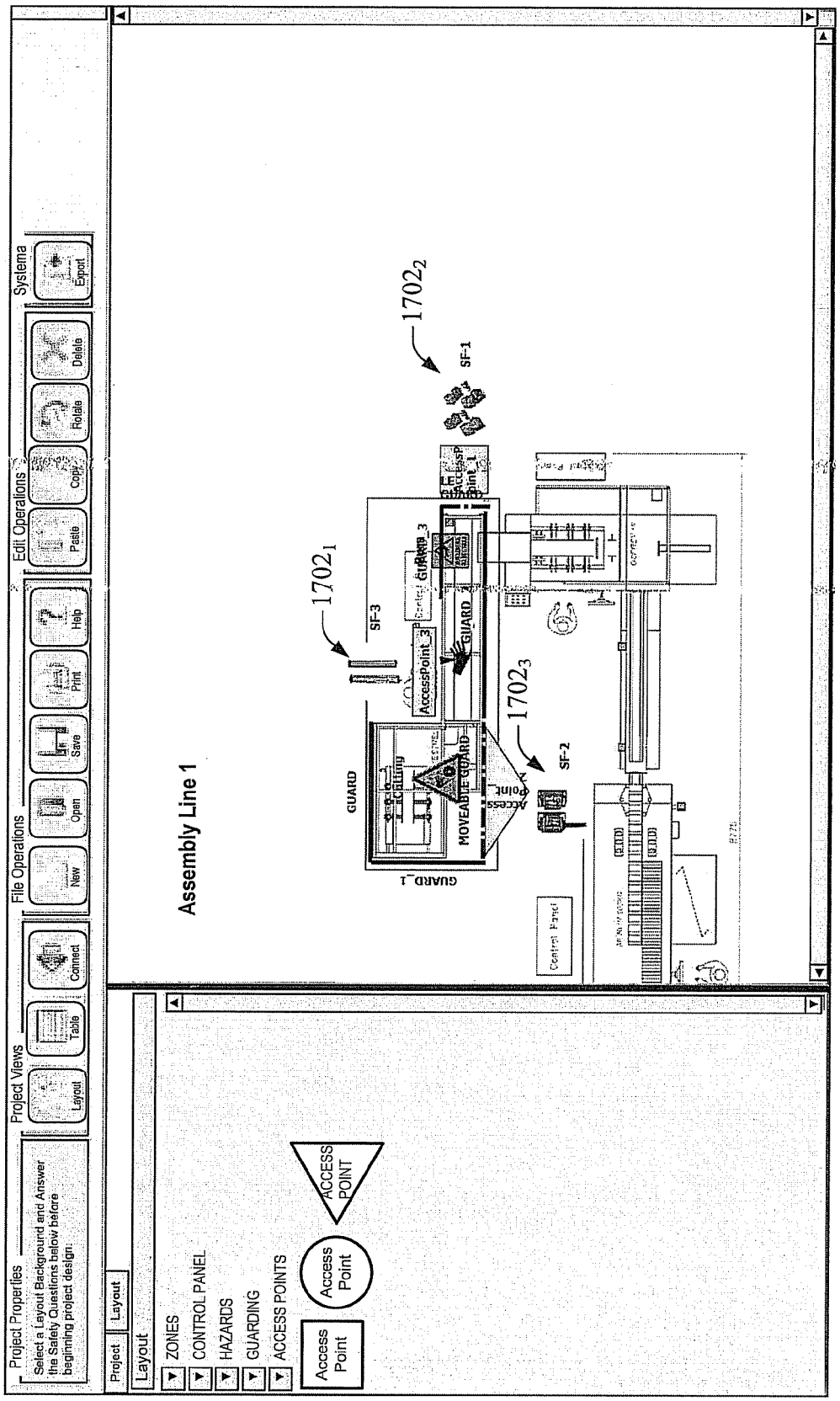
FIG. 17 illustrates an exemplary safety automation builder interface screen on which graphical icons for selected input safety devices have been added to an assembly line image.

Upon final selection of an input device, the safety automation builder can present the user with an image representing the input device, which can be dragged to the Assembly Line 1 representation in the layout area. FIG. 17 illustrates placement of input device images 1702$_{1-3}$ on the Assembly Line 1 representation for the three defined access points.

Figure 18:
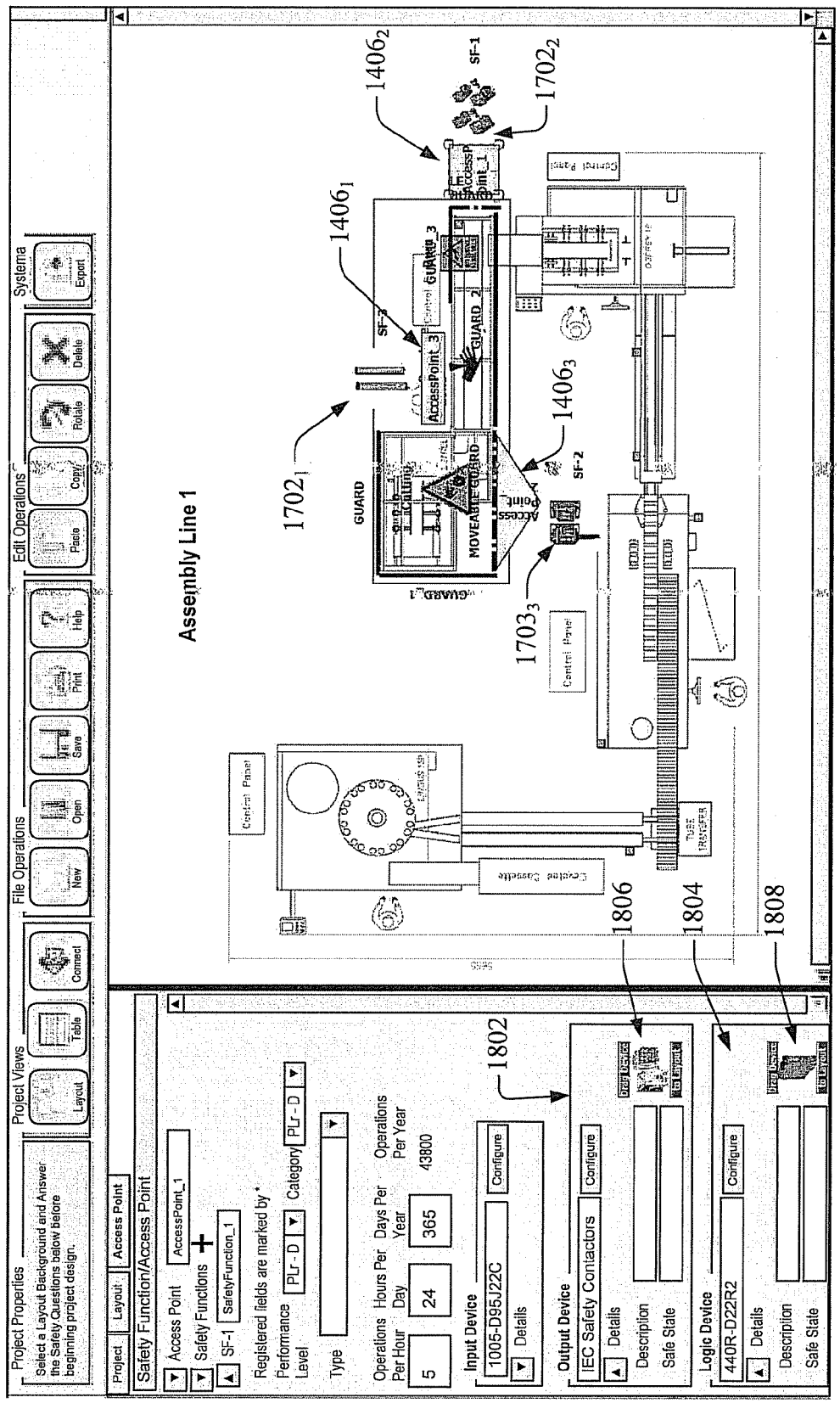
FIG. 18 illustrates an exemplary safety automation builder interface screen for selecting output and logic safety devices for an assembly line.

Using a workflow similar to that described above for selection of an input device, the user can select an output device and a logic device for the new safety function. As illustrated in FIG. 18, an output device (IEC Safety contactor) and a logic device (440R-D22R2 safety relay) has been selected. Upon selection of the output device and logic device, images 1806 and 1808 representing the respective output and logic devices selected by the user are displayed in the corresponding Details areas. If desired, the user can drag these images to the layout area and place the images on the Assembly Line 1 representation in similar fashion to the input device images 1702$_{1-3}$. However, the user may opt to leave these images off of the Assembly Line 1 graphical representation for reasons of clarity.

The process described above for configuring a safety function for the first access point can be repeated for all other access points defined for the system. Additionally, the safety automation builder allows the user to configure more than one safety function (each comprising an input, output, and logic device) for a given access point. As illustrated in FIG. 18, each of the three access points 1406$_{1-3}$ defined for Assembly Line 1 (as described above in connection with FIG. 14) have been assigned respective safety functions SF-1, SF-2, and SF-3. Images 1702$_{1-3}$ representing the input devices selected for the respective safety functions have been placed on the graphical representation of Assembly Line 1 near their corresponding access points.

Although the present example describes construction of a safety function by individually selecting each of the input, output, and logic safety devices, one or more embodiments of the safety automation builder can also include a number of preconfigured safety functions that each comprise a pre-selected input, output, and logic device. These predefined safety functions may correspond to commonly used safety functions, and may be selected from a predefined safety function data field (e.g., a drop-down field, a browsable interface, etc.). Selection of a predefined safety function will automatically populate the input, output, and logic device fields with the devices corresponding to the selected preconfigured safety function.

In addition, after a user has selected an input, output, and logic device for a given application, one or more embodiments of the safety automation builder can allow the user to store the resulting safety function as a user-defined safety function. Once created and stored, the user-defined safety function can be selected during configuration of subsequent applications, similar to the predefined safety functions. In this way, safety functions that will be used on multiple automation systems can be stored the first time the safety function is created, and thereafter selected on subsequent applications to facilitate automated configuration of the input, output, and logic device fields.

Figure 19:
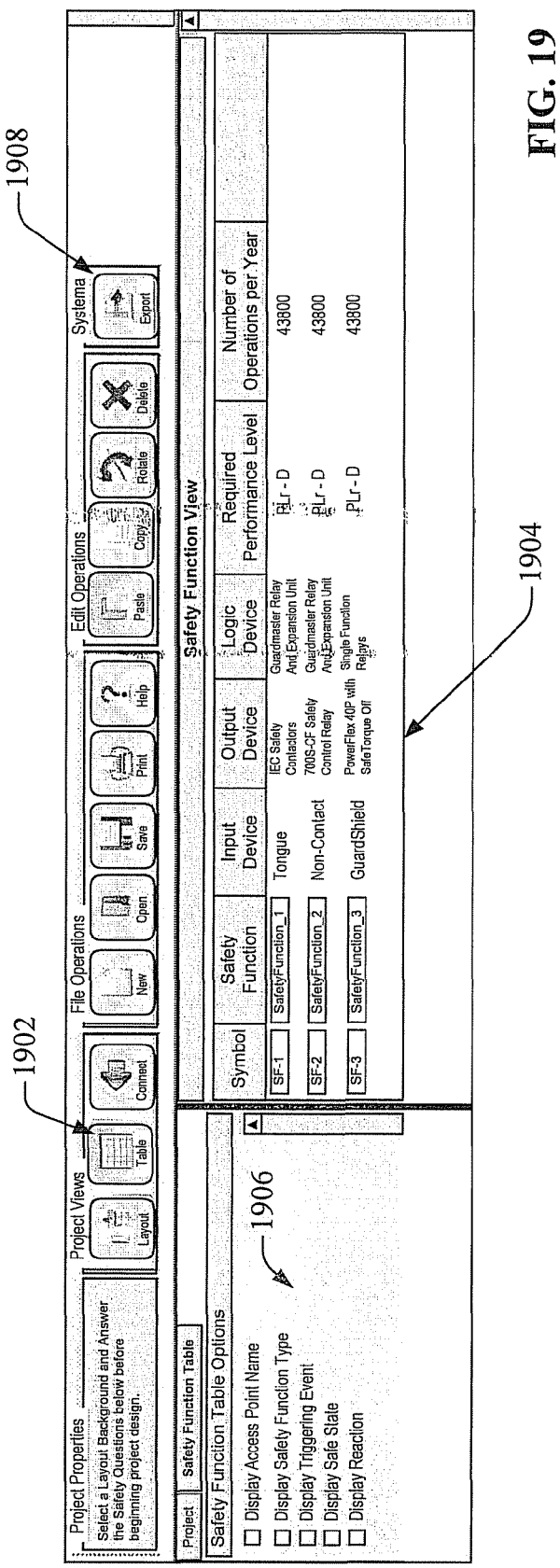
FIG. 19 illustrates an exemplary safety function view presented by the safety automation builder.

With these safety functions defined, the safety automation builder can organize and document the safety function data in a number of ways. Turning now to FIG. 19, selection of the Table button 1902 in the upper toolbar displays a safety function view of the configured safety system, including a safety function table 1904 (similar to safety function table 802 of FIG. 8) listing each defined safety function (SF-1, SF-2, and SF-3 in the present example) and associated data. Each safety function entry includes data columns for the input, output, and logic devices selected for the safety function, as well as the required performance level and expected number of operations per year for the safety function. The data presented in the safety function table 1904 corresponds to the data provided by the user under the guidance of the safety automation builder as described above.

In one or more embodiments, this basic set of safety function data can correspond to the data required by a separate performance level verification system (e.g., performance level verification system 310 of FIG. 3). Selecting the Export button 1908 in the upper toolbar can cause the data tabulated in the safety function table 1904 to be exported to the performance level verification system (e.g., via performance level verification interface 214 of FIG. 2) for analysis. If the performance level verification system is not already running on the user's local client device, selection of the Export button 1908 can launch the verification system prior to exporting the safety function data. The performance level verification system itself may comprise a software tool designed to verify a safety function's compliance with a required performance level. Some such verification tools require the safety function data to be entered manually by a user. However, the export tool of the safety automation builder, using performance level verification interface 214, can automatically populate the required fields in the performance level verification system with the data tabulated in the safety function table 1904, mitigating the need to enter this data into the verification system manually. In response, the performance level verification system can perform the necessary verification analysis on each defined safety function based on the exported data. In one or more embodiments, the performance level verification interface 214 can be configured to receive verification report data from the performance level verification system and render the results of the analysis on the safety automation builder interface as a safety document.

The safety function view interface can also include a number of additional viewing option checkboxes 1906 that allow the user to add additional data columns to safety function table 1904. Selecting one of the checkboxes 1906 will add the selected data item to the safety function table 1904. These optional table columns can include, for example, the access point name, safety function type, triggering event (e.g., light curtain break), safe state of the safety function, and reaction of the safety function to the triggering event. These data items can be determined based on the data selected or entered by the user during configuration of the safety functions as described above, as well as product data for the selected safety devices retrieved from the safety device library.

In addition to the safety function table 1904, the safety automation builder can generate a bill of materials based on the data entered or selected by the user and the product data retrieved from the safety device library (e.g., bill of materials 702 of FIG. 7). Moreover, the final system layout drawing—including representations of the zones, guarding, hazard indicators, access points, and safety function devices added by the user during the development steps described above—can be saved and printed for documentation purposes. In the present example, the final system layout drawing would resemble the Assembly Line 1 layout depicted in FIG. 18.

Figure 20:
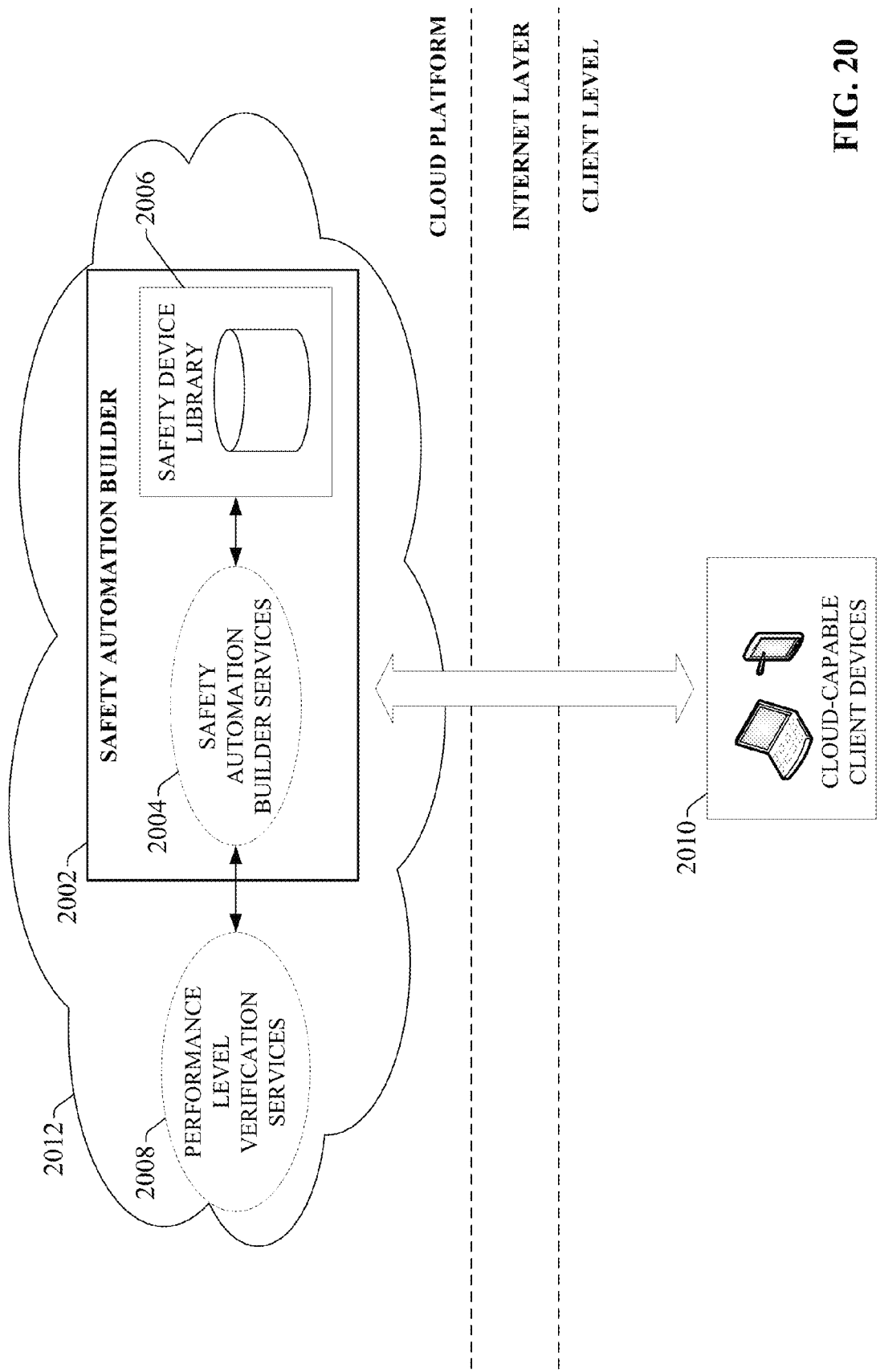
FIG. 20 illustrates an exemplary safety automation builder that runs as a cloud-based service.

One or more embodiments of the safety automation builder described herein can be executed locally on a user's client device (e.g., desktop computer, laptop computer, tablet computer, etc.) using the client device's local resources. In addition, some embodiments of the safety automation builder can reside and execute on a cloud platform for centralized access by cloud-capable devices. FIG. 20 illustrates an exemplary safety automation builder that runs as a cloud-based service. In this example, the safety automation builder 2002 executes as a cloud-based service hosted by cloud platform 2012. Cloud platform 2012 can be any infrastructure that allows shared computing services (e.g., safety automation builder services 2004) to be accessed and utilized by cloud-capable client devices 2010. Cloud platform 2012 can be a public cloud accessible via the Internet by devices having Internet connectivity and appropriate authorizations to utilize the services 2004. In some scenarios, cloud platform 2012 can be provided by a cloud provider as a platform-as-a-service (PaaS), and the safety automation builder services 2004 can reside and execute on the cloud platform 2012 as a cloud-based service. In some such configurations, access to the cloud platform 2012 and associated safety automation builder services 2004 can be provided to customers as a subscription service by an owner of the safety automation builder services 2004. Alternatively, cloud platform 2012 can be a private cloud operated internally by an industrial enterprise. An exemplary private cloud platform can comprise a set of servers hosting the safety automation builder services 2004 and residing on a corporate network protected by a firewall.

In the present cloud-based embodiment, safety automation builder services 2004 can implement the safety function development functions described above (e.g., safety automation builder interface features, device search features, safety function table generation, risk assessment features, etc.). However, rather than executing locally on a client device, these safety automation builder functions are made available as cloud-based safety automation builder services 2004 that execute using cloud resources of cloud platform 2012 (e.g., cloud-based processing and storage). As in previously described examples, cloud-based safety automation builder 2002 can include a safety device library 2006 containing information on available input, logic, and output safety devices, which can be accessed by the safety automation builder services 2004 to facilitate identification and selection of suitable safety function devices. Safety device library 2006 is maintained on cloud storage associated with cloud platform 2012. Maintaining safety device library 2006 on cloud-based storage allows for expansion of the library, since the cloud-based storage can be easily scaled to accommodate a growing library of devices.

Cloud-capable client devices 2010 can access the cloud-based safety automation builder 2002 through a generic Internet level. To facilitate client interaction with the safety automation builder services 2004, cloud-based safety automation builder 2002 can serve interface screens (e.g., the interface screens depicted in FIGS. 9-19) to the client devices 2010. The interface screens can then be viewed using the client devices' native display capabilities. The display screens can be preconfigured by an administrator of the cloud-based safety automation builder 2002, although some embodiments can allow the owners of the client devices 2010 to customize the way the interface screens are presented on the respective devices. Client devices 2010 can comprise personal device such as mobile phones having graphical display capabilities, desktop or laptop computers, tablet computers, or other such devices.

Similar to examples described above, safety automation builder services 2004 can include the capability to export configured safety function data to a separate performance level verification system to confirm compliance with the required performance levels (as dictated by prescribed industrial safety standards). As with safety automation builder services 2004, the performance level verification system may be a cloud-based system comprising performance level verification services 2008 that reside on cloud platform 2012 (or on a separate cloud platform or a web server), and that execute using cloud-based resources (e.g., storage and processing) associated with the cloud platform 2012. Accordingly, once a user has developed the necessary safety functions for a given automation system via client devices 2010, safety automation builder services 2004 can export portions at the safety function data to performance level verification services 2008, which can perform the necessary verification calculations on the data and return a report confirming whether the safety function designs satisfy the required performance levels.

Cloud-based safety automation builder 2002 can provide centralized access to the safety automation builder services 2004 to multiple customers at disparate geographical locations. Access to the safety automation builder services 2004 can be provided, for example, using a subscription model wherein customers pay a subscription fee in exchange for access to the services. Moreover, the cloud-based implementation can allow authorized customers to save their safety function documentation on cloud storage allocated for use by the customer. For example, after the user has been guided through the process of developing all necessary safety functions for their system, the resulting safety function documentation—including safety function tables, layout drawings, bill of materials, etc.—can be saved on the cloud platform 2012 on a portion of cloud storage allocated to the user as part of the user's subscription agreement.

Figure 21:
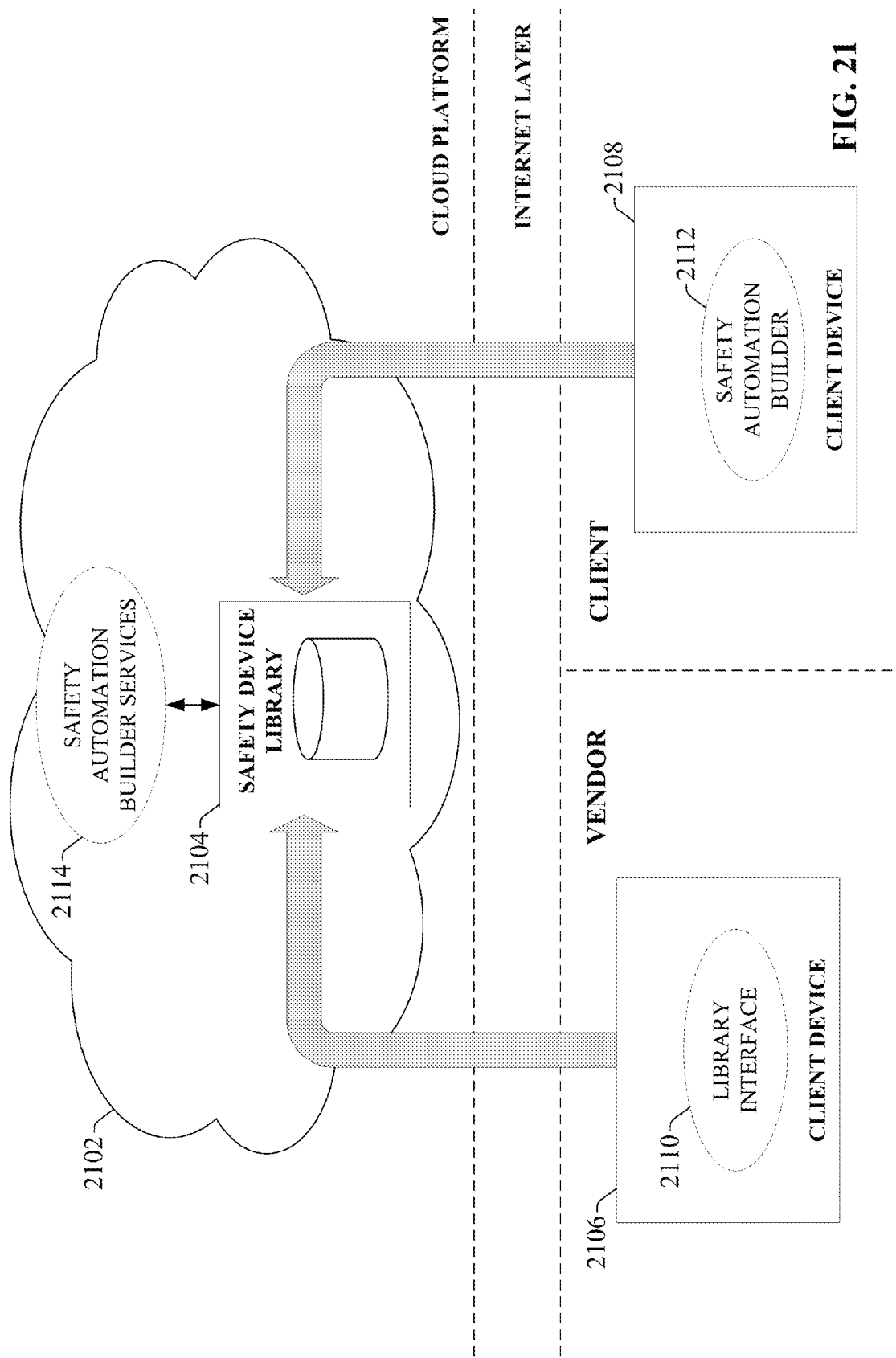
FIG. 21 illustrates centralized access to a cloud-based safety device library by vendors and clients.

Maintaining the safety device library on web-based or cloud-based storage can allow safety device vendors with suitable access privileges to maintain the library with up-to-date information about their safety products. FIG. 21 illustrates centralized access to a cloud-based safety device library by vendors and clients. Similar to the example discussed above in connection with FIG. 20, cloud platform 2102 maintains a safety device library 2104 on cloud-based storage associated with the cloud platform. Safety device library 2104 can be accessed by cloud-based safety automation builder services 2114 (similar to safety automation builder services 2004 of FIG. 20) to facilitate guided configuration of safety functions, as described above in previous examples. Alternatively, safety device library 2104 can be accessed by a local safety automation builder 2112 that executes locally on a cloud-capable client device 2108.

Additionally, safety device library 2104 can be accessed by a client device 2106 associated with a safety device vendor having suitable write privileges to the library. Such write privileges can allow the vendor to add or modify product data on the safety device library 2104, including but not limited to catalog numbers, product specification data, product pricing data, etc. To this end, the cloud platform 2102 can serve a library interface 2110 to the vendor's client device 2106 that provides the necessary graphical interface screens and data fields for adding new products or editing existing product data on the safety device library 2104. In this way, the safety product data made available to the cloud-based safety automation builder 2114 (or local safety automation builder 2112) can be kept current, accurately reflecting the vendor's current product availability and pricing.

Figure 22:
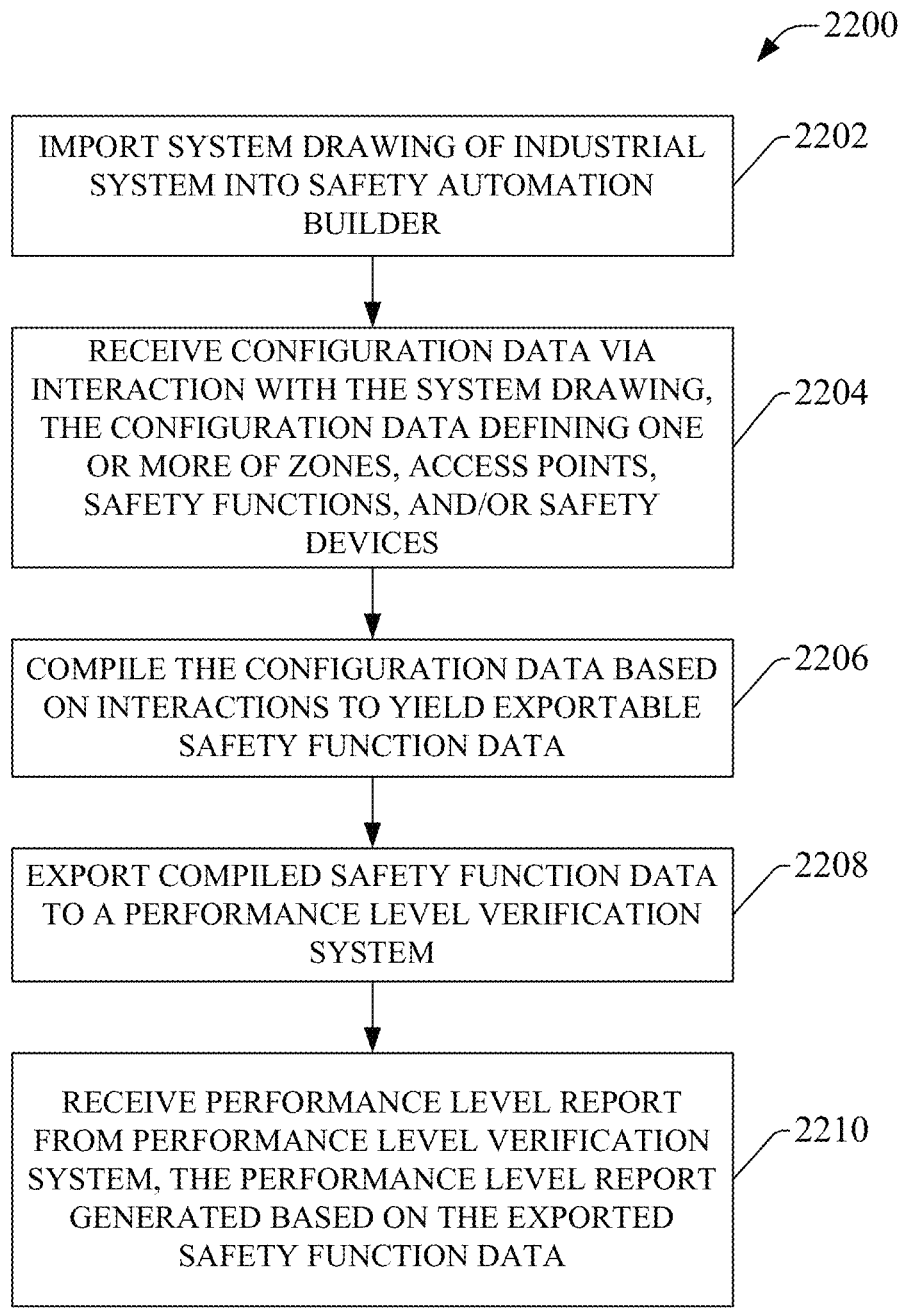
FIG. 22 is a flowchart of an example methodology for compiling and exporting safety function data for performance level verification.
Figure 23:
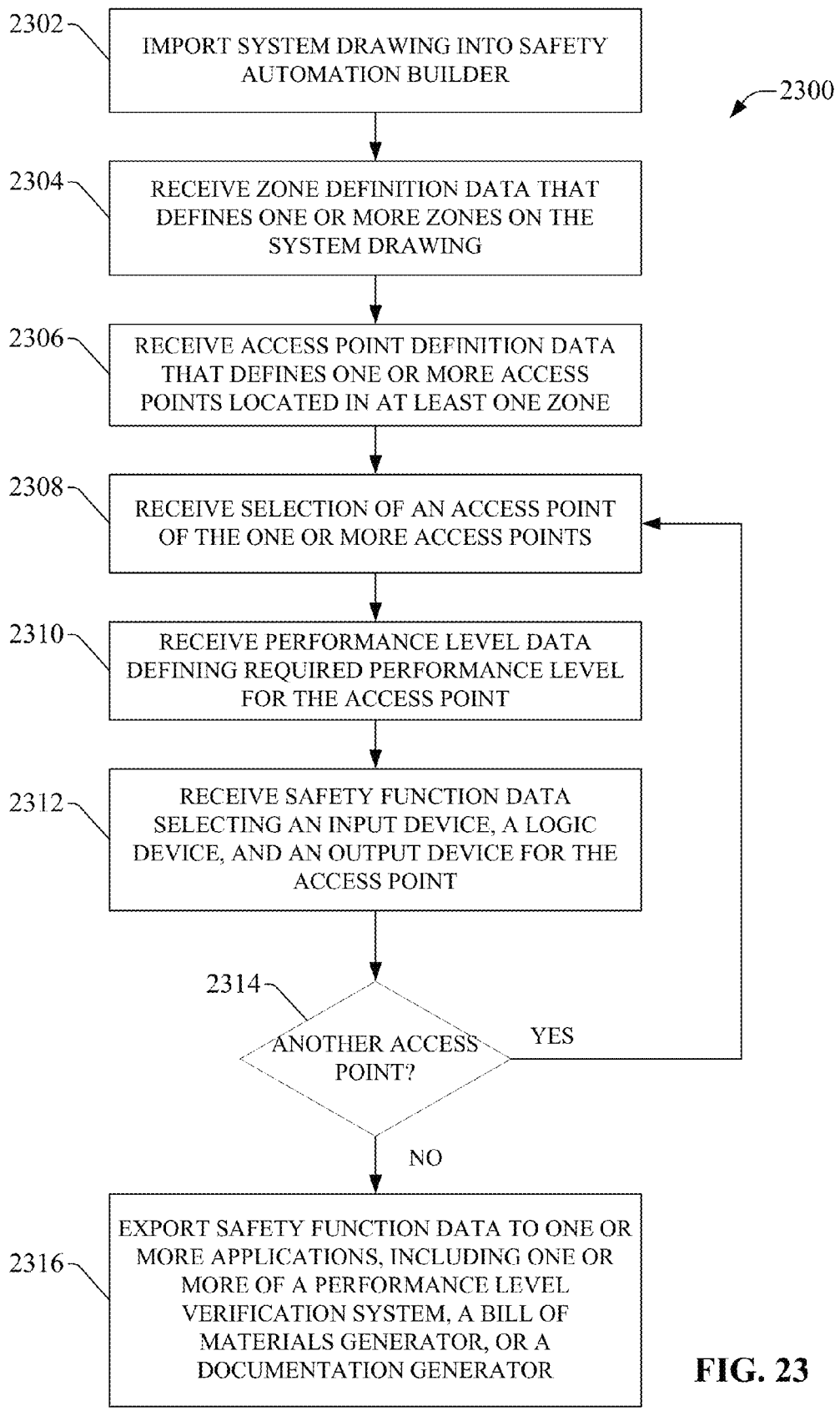
FIG. 23 is a flowchart of an example methodology for configuration of safety functions for an automation line or machine using a safety automation builder.
Figure 24:
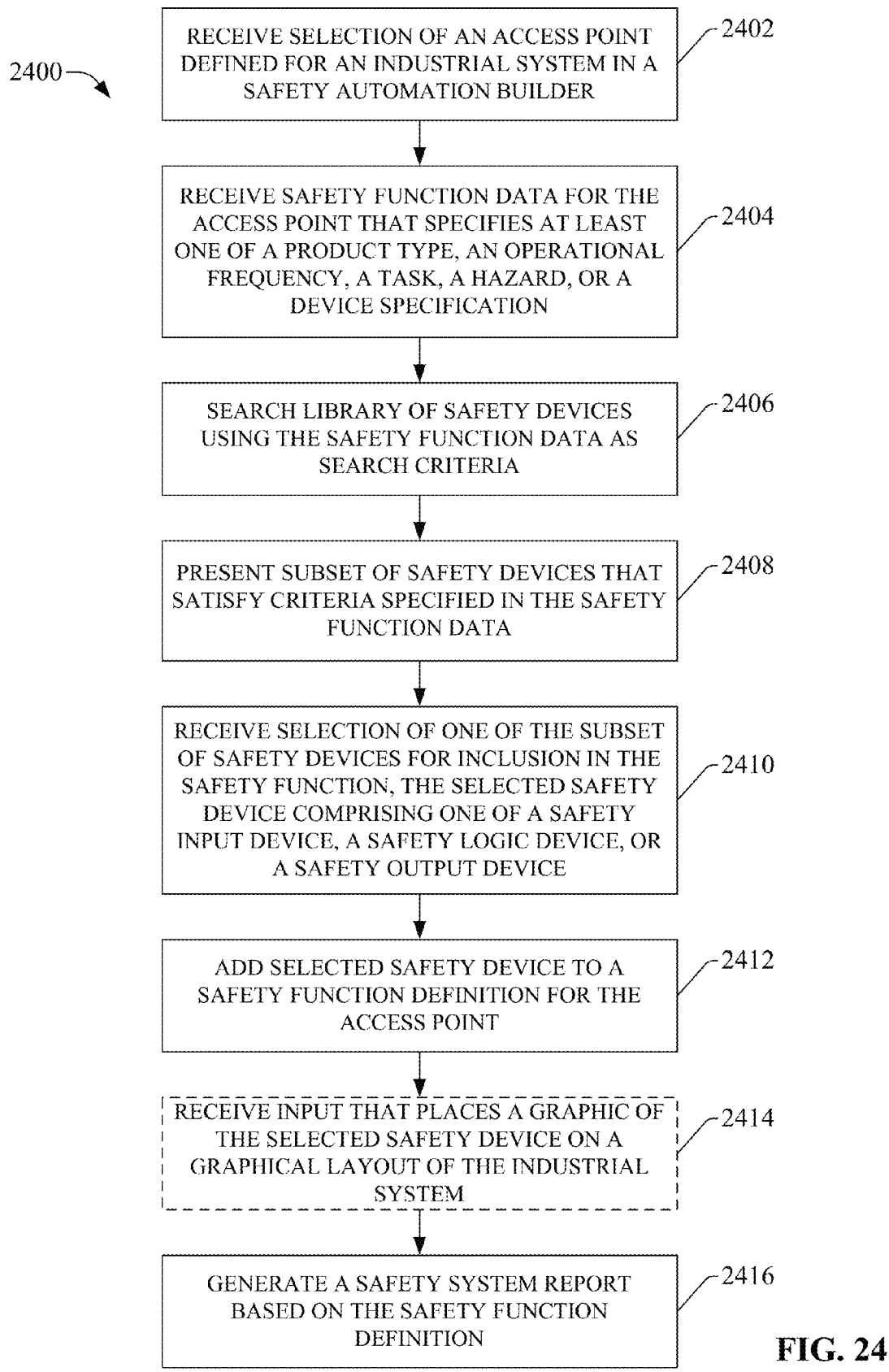
FIG. 24 is a flowchart of an example methodology for assisted safety device selection using a safety automation builder.

FIGS. 22-24 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 22 illustrates an example methodology 2200 for compiling and exporting safety function data for performance level verification. Initially at 2202, a system drawing of an industrial system is imported into a safety automation builder. The system drawing can comprise, for example, a machine elevation drawing of a manufacturing line, machine, or production area for which one or more safety functions are to be designed. At 2204, configuration data is received via interaction with the system drawing, wherein the configuration data defines one or more of zones, hazardous access points, safety functions, and/or safety devices associated with the safety functions. The configuration data can be provided to the safety automation builder by selecting and dragging access point indicators to the locations on the system drawing corresponding to hazardous access points, graphically superimposing safety guard drawings and zone definition indicators, selecting safety function devices from a list of suitable safety function devices presented by the safety automation builder, or other such interactions.

At 2206, the configuration data received via interaction with the system drawing is compiled to yield exportable safety function data. The safety function data can include, for example, a list of all safety functions defined for the automation system; identification of the input, output, and logic devices selected for each defined safety function; a required performance level for each defined safety function, and/or other such information. At 2208, the compiled safety function data is exported to a performance level verification system capable of analyzing the safety function data to determine whether the designed safety functions are capable of achieving the required performance levels. At 2210, a performance level report is received from the performance level verification system. The performance level report includes verification information confirming whether each defined safety function specified in the exported safety function data will achieve the required performance level, and is generated based on the exported safety function data.

FIG. 23 illustrates an example methodology 2300 for configuration of safety functions for an automation line or machine using a safety automation builder. Initially, at 2302, a system drawing of the automation line, machine, or production area for which the safety functions are to be configured is imported into the safety automation builder. At 2304, zone definition data is received that defines one or more zones on the system drawing. In one or more embodiments, the zone definition data can be received through user interaction with the system drawing in the safety automation builder. Such user interaction can comprise, for example, drawing zone boundaries around each zone and naming the zones. At 2306, access point definition data is received that defines one or more hazardous access points located in at least one of the defined zones. As with the zone definition data, the access point definition data can be received via user interaction with the system drawing, where such user interaction can include adding access point indicators on or near the access points on the system drawing.

At 2308, one of the access points defined in step 2306 is selected for configuration. At 2310, performance level data defining a required performance level for the selected access point is received. The required performance level can be determined, for example, based on a risk assessment performed previously on the automation line, machine, or production area. The required performance level can be entered by the user using a designated field provided by the safety automation builder. At 2312, safety function data specifying a safety function to be used to protect the selected access point is received. The safety function data can include identification of suitable input, logic, and output devices for the safety function, as well as any appropriate configuration data for the selected devices. In one or more embodiments, the safety automation builder can assist the user in selecting appropriate devices for the safety function based on the required performance level provided at step 2310, a type of safety function indicated by the user, or other device specifications provided by the user in response to prompts from the safety automation builder.

At 2314, a determination is made regarding whether additional access points need to be configured. If it is determined that there are additional access points, the method returns to step 2308, where another access point is selected and steps 2310 and 2312 are repeated to configure a safety function for the next selected access point. If it is determined that there are no additional access points (that is, safety functions have been defined for all access points defined in step 2306), the method moves to step 2316, where the safety function data collected in steps 2304-2314 are exported to one or more applications for processing. Such applications can include, but are not limited to, a performance level verification system, a bill of materials generator, or other documentation generating applications.

FIG. 24 illustrates an example methodology 2400 for assisted safety device selection using a safety automation builder. Initially, at 2402, selection of an access point defined for an industrial system is received in a safety automation builder. The access point can be defined in the safety automation according to techniques described above. At 2404, safety function data for the selected access point can be received in the safety automation builder. The safety function data can relate to a safety function intended to mitigate the risk of injury associated with the access point in accordance with prescribed safety standards, and can include such information as a required performance level, a desired product type, an expected operational frequency, a safety task to be performed, a hazard which the safety function is to intended to counter, device specification information, and/or other such data. The safety function data can be provided by a user under the guidance of the safety automation builder, which can prompt the user for the information necessary to identify suitable devices for the safety function.

At 2406, a library of safety device is searched using the safety function data provided in step 2404 as search criteria. In one or more embodiments, the library can reside locally as part of the safety automation builder. Alternatively, the library can reside on a web server or cloud platform accessible via the Internet, and the safety automation builder can access the library over a network connection. The search can identify a subset of input, output, and logic safety devices meeting the criteria provided at step 2404. At 2408, a subset of safety devices that satisfy the criteria specified in the safety function data is presented. The safety automation builder can select, as the subset of safety devices, those devices that are capable of achieving the required performance level given the indicated operational frequency, in accordance with the safety standards.

At 2410, selection of one of the subset of safety devices for inclusion in the safety function is received. For example, if the safety function input device is being selected, the subset of safety devices presented in step 2408 can comprise only input safety device, and the user can select from the subset a desired input device to be incorporated in the safety function. Subsequently, the user can be presented with a subset of output safety devices based on the entered criteria, and a suitable output device can be selected. Finally, a suitable logic safety device can be selected from a presented list of logic safety devices satisfying the entered criteria.

At 2412, the selected safety device is added to a safety function definition for the access point selected at step 2402. Optionally, at 2414, a graphic of the selected safety device can be placed on a graphical layout of the industrial system that has been imported into the safety automation builder. Finally, at 2416, a safety system report is generated based on the safety function definition created at step 2412. The safety system report can comprise, for example, a bill of materials including all selected safety devices and associated specification and pricing data, a safety function table that lists all defined safety functions and their associated safety device, a line layout drawing that includes graphical representations of the safety functions on or near their associated access points, or other such reports. In another example, the safety function data can be exported to a separate performance level verification system for confirmation that the safety functions are capable of satisfying the required performance levels.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 25:
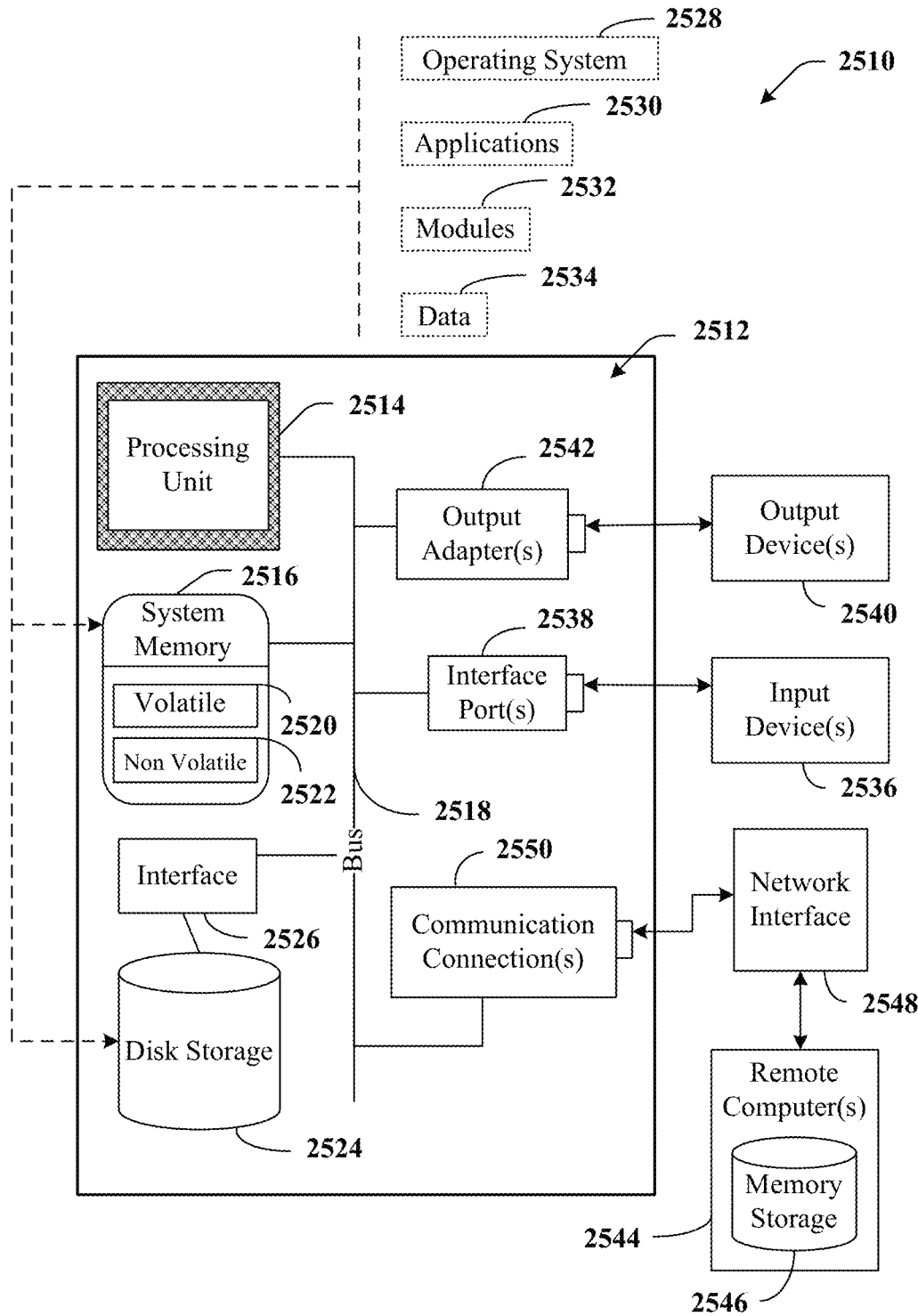
FIG. 25 is an example computing environment.
Figure 26:
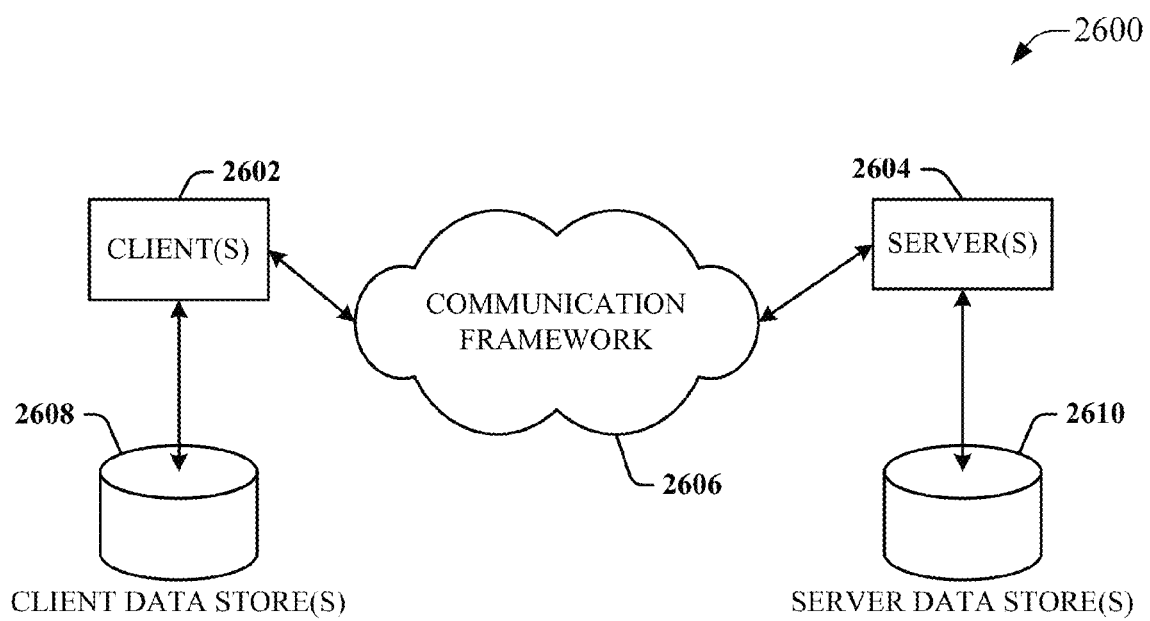
FIG. 26 is an example networking environment.

In order to provide a context for the various aspects of the disclosed subject matter, FIGS. 25 and 26 as well as the following discussion are intended to provide a brief, general description of a suitable environment in which the various aspects of the disclosed subject matter may be implemented.

With reference to FIG. 25, an example environment 2510 for implementing various aspects of the aforementioned subject matter includes a computer 2512. The computer 2512 includes a processing unit 2514, a system memory 2516, and a system bus 2518. The system bus 2518 couples system components including, but not limited to, the system memory 2516 to the processing unit 2514. The processing unit 2514 can be any of various available processors. Multi-core microprocessors and other multiprocessor architectures also can be employed as the processing unit 2514.

The system bus 2518 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 2516 includes volatile memory 2520 and nonvolatile memory 2522. The basic input/output system (BIOS), containing the basic routines to transfer information between elements within the computer 2512, such as during start-up, is stored in nonvolatile memory 2522. By way of illustration, and not limitation, nonvolatile memory 2522 can include read only memory (ROM), programmable ROM (PROM), electrically programmable ROM (EPROM), electrically erasable PROM (EEPROM), or flash memory. Volatile memory 2520 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2512 also includes removable/non-removable, volatile/non-volatile computer storage media. FIG. 25 illustrates, for example a disk storage 2524. Disk storage 2524 includes, but is not limited to, devices like a magnetic disk drive, floppy disk drive, tape drive, Jaz drive, Zip drive, LS-100 drive, flash memory card, or memory stick. In addition, disk storage 2524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 2524 to the system bus 2518, a removable or non-removable interface is typically used such as interface 2526.

It is to be appreciated that FIG. 25 describes software that acts as an intermediary between users and the basic computer resources described in suitable operating environment 2510. Such software includes an operating system 2528. Operating system 2528, which can be stored on disk storage 2524, acts to control and allocate resources of the computer 2512. System applications 2530 take advantage of the management of resources by operating system 2528 through program modules 2532 and program data 2534 stored either in system memory 2516 or on disk storage 2524. It is to be appreciated that one or more embodiments of the subject disclosure can be implemented with various operating systems or combinations of operating systems.

A user enters commands or information into the computer 2512 through input device(s) 2536. Input devices 2536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2514 through the system bus 2518 via interface port(s) 2538. Interface port(s) 2538 include, for example, a serial port, a parallel port, a game port, and a universal serial bus (USB). Output device(s) 2540 use some of the same type of ports as input device(s) 2536. Thus, for example, a USB port may be used to provide input to computer 2512, and to output information from computer 2512 to an output device 2540. Output adapter 2542 is provided to illustrate that there are some output devices 2540 like monitors, speakers, and printers, among other output devices 2540, which require special adapters. The output adapters 2542 include, by way of illustration and not limitation, video and sound cards that provide a means of connection between the output device 2540 and the system bus 2518. It should be noted that other devices and/or systems of devices provide both input and output capabilities such as remote computer(s) 2544.

Computer 2512 can operate in a networked environment using logical connections to one or more remote computers, such as remote computer(s) 2544. The remote computer(s) 2544 can be a personal computer, a server, a router, a network PC, a workstation, a microprocessor based appliance, a peer device or other common network node and the like, and typically includes many or all of the elements described relative to computer 2512. For purposes of brevity, only a memory storage device 2546 is illustrated with remote computer(s) 2544. Remote computer(s) 2544 is logically connected to computer 2512 through a network interface 2548 and then physically connected via communication connection 2550. Network interface 2548 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2550 refers to the hardware/software employed to connect the network interface 2548 to the system bus 2518. While communication connection 2550 is shown for illustrative clarity inside computer 2512, it can also be external to computer 2512. The hardware/software necessary for connection to the network interface 2548 includes, for exemplary purposes only, internal and external technologies such as, modems including regular telephone grade modems, cable modems and DSL modems, ISDN adapters, and Ethernet cards.

FIG. 26 is a schematic block diagram of a sample computing environment 2600 with which the disclosed subject matter can interact. The system 1800 includes one or more client(s) 2602. The client(s) 2602 can be hardware and/or software (e.g., threads, processes, computing devices). The sample computing environment 2600 also includes one or more server(s) 2604. The server(s) 2604 can also be hardware and/or software (e.g., threads, processes, computing devices). The servers 2604 can house threads to perform transformations by employing one or more embodiments as described herein, for example. One possible communication between a client 2602 and a server 2604 can be in the form of a data packet adapted to be transmitted between two or more computer processes. The sample computing environment 2600 includes a communication framework 2606 that can be employed to facilitate communications between the client(s) 2602 and the server(s) 2604. The client(s) 2602 are operably connected to one or more client data store(s) 2608 that can be employed to store information local to the client(s) 2602. Similarly, the server(s) 2604 are operably connected to one or more server data store(s) 2610 that can be employed to store information local to the servers 2604.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

The invention claimed is:

1. A system for designing safety functions, comprising:
a memory that stores executable components; and
a processor, operatively coupled to the memory, that executes the executable components, the executable components comprising:
an interface component configured to render an image of an industrial automation system and to receive, via interaction with the image, access point configuration data relating to a hazardous access point of the industrial automation system, wherein the access point configuration data comprises:
zone information indicating a location of one or more zones on the image,
access point information indicating a location, on the image, of the hazardous access point associated with the one or more zones,
performance level information indicating a performance level requirement for the hazardous access point, and
operating frequency information indicating an expected operating frequency of a safety system comprising one or more safety devices associated with the hazardous access point;
a device search component configured to retrieve, from a safety device library, safety device data for the hazardous access point identifying a set of safety devices that satisfy the performance level and the expected operating frequency of the safety system specified by the access point configuration data, wherein the interface component is further configured to receive, as part of the access point configuration data, selection data indicating a selected safety device, from the set of safety devices, to be associated with the hazardous access point; and
a safety function table generator configured to generate a table that tabulates the access point configuration data received via the interaction with the image to yield tabulated data conforming to a format required by a performance level verification system.

2. The system of claim 1, further comprising a performance level verification interface configured to export the tabulated data to corresponding fields of the performance level verification system and to receive verification data from the performance level verification system indicating whether one or more safety functions defined by the access point configuration data satisfy a standardized performance level required for the hazardous access point.

3. The system of claim 2, further comprising a bill of materials generator configured to generate a bill of materials for the one or more safety functions based on the specification data.

4. The system of claim 1, wherein the access point configuration data further comprises at least one of, category data indicating a category of a safety function required for the hazardous access point, safety function type information specifying a type of the safety function, or hazard information specifying a type of hazard associated with the hazardous access point.

5. The system of claim 1, wherein the tabulated data comprises at least one of a name of one or more safety functions defined by the access point configuration data, an input device comprising the one or more safety functions, an output device comprising the one or more safety functions, a logic device comprising the one or more safety functions, a triggering event for the one or more safety functions, a safe state of the one or more safety functions, or a reaction of the one or more safety functions in response to the trigger event.

6. The system of claim 1, wherein
the safety function table generator is further configured to organize the tabulated data for one or more safety functions according to the one or more zones defined by the zone information.

7. The system of claim 1, wherein the interface component is further configured to superimpose a graphical icon on the image based on the interaction with the image, and wherein the graphical icon represents at least one of an input safety device for one or more safety functions, an output safety device for the one or more safety functions, a logic safety device for the one or more safety functions, an access point indicator, a hazard indicator, a separating guard, a non-separating guard, or a zone boundary.

8. The system of claim 1, wherein at least one of the safety device library, the interface component, the device search component, or the safety function table generator is configured to reside on at least one of a web server or a cloud platform.

9. The system of claim 1, wherein the interface component is further configured to present a sequence of prompts to facilitate receipt of the access point configuration data.

10. A method for configuring a safety function for an industrial automation system, comprising:
receiving, by a system comprising at least one processor and via interaction with an image representing an industrial automation system, access point configuration data describing criteria for a safety function associated with a hazardous access point of the industrial automation system, wherein the receiving comprises:
receiving zone information indicating a location of one or more zones on the image,
receiving access point information indicating a location, on the image, of the hazardous access point associated with the one or more zones,
receiving performance level information indicating a performance level requirement for the hazardous access point, and
receiving operating frequency information indicating an expected operating frequency of a safety system comprising one or more safety devices associated with the hazardous access point;
receiving, by the system from a safety device library, safety device data identifying a set of safety devices that satisfy the performance level and the expected operating frequency of the safety system specified by the access point configuration data;
receiving, by the system as part of the access point configuration data, selection data identifying a selected safety device, of the set of safety devices, to be associated with the hazardous access point; and
tabulating, by the system, the access point configuration data received via the interaction with the image to yield tabulated data that conforms to a format used by a performance level verification system.

11. The method of claim 10, further comprising exporting the tabulated data to corresponding fields of the performance level verification system.

12. The method of claim 11, further comprising displaying verification data received from the performance level verification system indicating whether the safety function defined by the access point configuration data satisfies a standardized performance level required for the hazardous access point.

13. The method of claim 10, further comprising generating a bill of materials for the safety function based on the specification data, wherein the bill of materials includes information relating to at least one of an input device comprising the safety function, an output device comprising the safety function, or a logic device comprising the safety function.

14. The method of claim 10, wherein the receiving the access point configuration data further comprises receiving at least one of a category of safety function required for the hazardous access point, a type of the safety function, or a type of hazard associated with the hazardous access point.

15. The method of claim 10, wherein tabulating the access point configuration data comprises populating fields of a table with information relating to at least one of a name of the safety function, an input device comprising the safety function, an output device comprising the safety function, a logic device comprising the safety function, a triggering event for the safety function, a safe state of the safety function, or a reaction of the safety function in response to the trigger event.

16. A non-transitory computer-readable medium having stored thereon computer-executable instructions that, in response to execution, cause a computing system to perform operations, the operations comprising:
receiving, via interaction with an image representing an industrial automation system, access point data specifying one or more criteria for mitigating risk associated with a hazardous access point of the industrial automation system, wherein the receiving comprises:
receiving zone information indicating a location of one or more zones on the image,
receiving access point information indicating a location, on the image, of the o hazardous access point associated with the one or more zones,
receiving performance level information indicating a performance level requirement for the hazardous access point, and receiving operating frequency information indicating an expected operating frequency of a safety system comprising one or more safety devices associated with the hazardous access point;

presenting safety device information identifying a subset of safety devices selected from a safety device library, wherein the subset of safety devices are selected based on a determination that the subset of safety devices satisfy the performance level and the expected operating frequency of the safety system defined by the access point data;

receiving, as part of the access point configuration data, selection data identifying a selected safety device, of the subset of safety devices, to be associated with the hazardous access point; and tabulating the access point configuration data received via the interaction with the image to yield tabulated data that conforms to a format compatible with a performance level verification system.

17. The non-transitory computer-readable medium of claim 16, the operations further comprising exporting at least a portion of the tabulated data to corresponding fields of the performance level verification system.

18. The non-transitory computer-readable medium of claim 17, the operations further comprising receiving, from the performance level verification system, a report indicating whether the safety function satisfies a standardized performance level associated with the hazardous access point.

19. The non-transitory computer-readable medium of claim 16, the operations further comprising generating a bill of materials for the safety function based on the specification data, wherein the bill of materials includes information relating to at least one of an input device comprising the safety function, an output device comprising the safety function, or a logic device comprising the safety function.

20. The non-transitory computer-readable medium of claim 16, the receiving the access point data further comprises receiving at least one of a category of safety function required for the hazardous access point, a type of the safety function, or a type of hazard associated with the hazardous access point.

* * * * *